United States Patent
Tsai et al.

(10) Patent No.: US 11,533,742 B2
(45) Date of Patent: Dec. 20, 2022

(54) SMALL DATA TRANSMISSION WITH NON-ORTHOGONAL MULTIPLE ACCESS

(71) Applicant: IPLA Holdings Inc., New York, NY (US)

(72) Inventors: Allan Y. Tsai, Boonton, NJ (US); Qing Li, Princeton Junction, NJ (US); Guodong Zhang, Woodbury, NY (US); Yifan Li, Conshohocken, PA (US); Lakshmi R. Iyer, King of Prussia, PA (US); Pascal M. Adjakple, Great Neck, NY (US); Mohamed Awadin, Plymouth Meeting, PA (US); Joseph M. Murray, Schwenksville, PA (US)

(73) Assignee: IPLA Holdings Inc., New York, NY (US)

( * ) Notice: Subject to any disclaimer, the term of this patent is extended or adjusted under 35 U.S.C. 154(b) by 63 days.

(21) Appl. No.: 17/051,195

(22) PCT Filed: May 10, 2019

(86) PCT No.: PCT/US2019/031739
§ 371 (c)(1),
(2) Date: Oct. 28, 2020

(87) PCT Pub. No.: WO2019/217829
PCT Pub. Date: Nov. 14, 2019

(65) Prior Publication Data
US 2021/0243777 A1    Aug. 5, 2021

Related U.S. Application Data

(60) Provisional application No. 62/716,730, filed on Aug. 9, 2018, provisional application No. 62/669,560, filed on May 10, 2018.

(51) Int. Cl.
*H04W 72/12* (2009.01)
*H04W 76/28* (2018.01)
(Continued)

(52) U.S. Cl.
CPC ... *H04W 72/1268* (2013.01); *H04W 72/1289* (2013.01); *H04W 72/14* (2013.01);
(Continued)

(58) Field of Classification Search
CPC ......... H04W 72/1268; H04W 72/1289; H04W 72/14; H04W 74/006
See application file for complete search history.

(56) References Cited

U.S. PATENT DOCUMENTS

2016/0338112 A1* 11/2016 Lee ..................... H04W 76/27
2017/0013610 A1*  1/2017 Lee ........................ H04L 1/00
(Continued)

FOREIGN PATENT DOCUMENTS

WO    2016/032077 A1    3/2016
WO    2016/105570 A1    6/2016

*Primary Examiner* — Min Jung
(74) *Attorney, Agent, or Firm* — Xsensus LLP

(57) ABSTRACT

Non-Orthogonal Multiple Access (NOMA) transmissions are described herein in which sequence collision is mitigated or eliminated by exploiting the randomness nature of user specific reference bits and data bits. Further, methods, systems, and devices that use NOMA for small data transmissions are disclosed.

19 Claims, 37 Drawing Sheets

(51) Int. Cl.
*H04W 72/14* (2009.01)
*H04W 74/00* (2009.01)
*H04W 74/08* (2009.01)

(52) U.S. Cl.
CPC ..... *H04W 74/006* (2013.01); *H04W 74/0841* (2013.01); *H04W 76/28* (2018.02)

(56) References Cited

U.S. PATENT DOCUMENTS

| | | | |
|---|---|---|---|
| 2017/0019930 A1* | 1/2017 | Lee | H04W 72/1284 |
| 2017/0367058 A1* | 12/2017 | Pelletier | H04W 52/246 |
| 2018/0213549 A1* | 7/2018 | Kim | H04W 72/1268 |
| 2019/0289592 A1* | 9/2019 | Lee | H04L 1/1854 |
| 2021/0168894 A1* | 6/2021 | Sha | H04W 72/0413 |

* cited by examiner

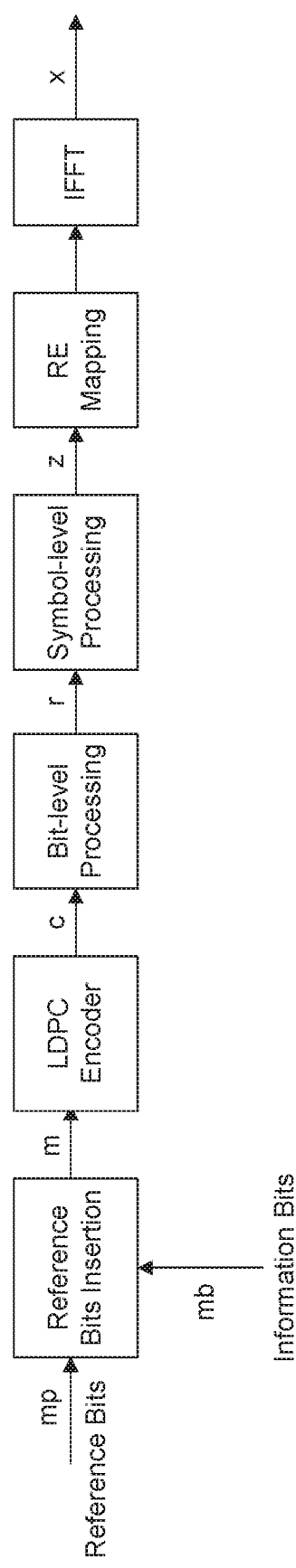
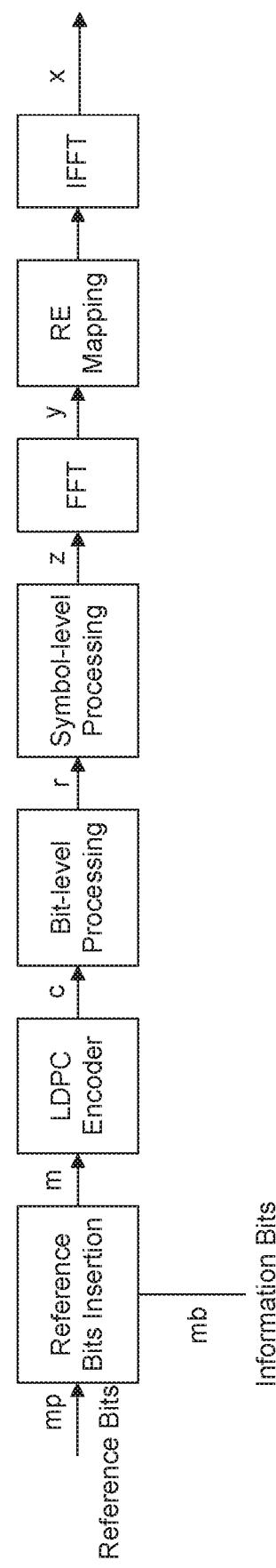
FIG. 23A
FIG. 23B

SMALL DATA TRANSMISSION WITH NON-ORTHOGONAL MULTIPLE ACCESS

CROSS-REFERENCE TO RELATED APPLICATIONS

This application is the National Stage of International Patent Application No. PCT/US2019/031739, filed May 10, 2019, which claims the benefit of U.S. Provisional Application No. 62/669,560, filed May 10, 2018 and U.S. Provisional Application No. 62/716,730, filed Aug. 9, 2018, the disclosures of which are incorporated herein by reference in their entireties.

BACKGROUND

In LTE, the transmission of data packets, for example small data transmission, requires an established Radio Resource Control (RRC) connection between a given UE and eNB. When an RRC connection has been established, the UE is in RRC Connected mode. After a device's inactivity period, the RRC connection is released through an S1-Release procedure, then the UE changes to RRC Idle mode. If an RRC Idle device wants to communicate with the network, it has to perform a scheduling request (SR) to establish the RRC connection and request resources again. It is recognized herein that is approach may not be efficient for small data transmission (SDT). 3GPP IoT has proposed solutions for reducing the signaling overhead required to establish and release RRC compared to conventional LTE. Two proposals are based on the Control Plane (CP), and the proposal is based on the User Plane (UP). Proposed solutions for small data transmission in LTE when UE is in the RRC idle mode are now summarized.

Service Request Signaling Messages represent the conventional data transmission procedure. FIG. 1 shows a typical sequence of signaling messages. The first four messages (messages 1-4) comprise the contention-based random access (RA) procedure. Steps 3 and 4 of the illustrated RA procedure are used as part of the RRC connection establishment. The subsequent signaling messages perform: UE's authentication in the Mobility Management Entity (MME) through Non-Access Stratum (NAS) security level (steps 6 and 7), Access Stratum (AS) security context establishment between the device and the eNB (steps 8 and 9), and RRC reconfiguration (steps 10 and 11).

Referring to FIG. 2, Control Plane (CP) Signaling Messages may use the control plane to forward the device's data packets. To do that, they may be sent through NAS messages to the MME. FIG. 2 shows a typical sequence of signaling messages. Contrary to conventional SR, the MME is responsible for the data packets' security check, and for forwarding them to the Serving Gateway (SGW) through the new S1-U bearer. The illustrated procedure does not apply AS security, and there is no RRC reconfiguration, which represents a reduction of signaling messages over the radio interface. Furthermore, the device can include in the NAS message the Release Assistance Indication (RAI) to the MME. This information can notify whether no further data transmission is expected. Then, the MME may release the connection immediately if there is no pending traffic, and the S1-U bearer (between eNB and SGW) is not established.

Referring to FIG. 3, User Plane (UP) Signaling Messages concern the transmission of data over the data plane, by means of preserving the RRC context instead of releasing it. Two control procedures are defined: Connection Resume and Suspend. Both are similar to two conventional control procedures, SR and S1-Release, respectively. However, the signaling messages slightly change. Compared with SR, the context of the RRC is stored in the UE and the network. Then, there is no need to reestablish the AS security context. FIG. 3 shows a typical sequence of UP signaling messages.

In LTE, Non-Orthogonal Multiple Access (NOMA) is introduced for downlink (DL) applications. LTE may support downlink intra-cell multi-user superposition transmission (MUST) for data channels with assistance information from a serving basing station (BS) to a user equipment (UE) regarding its experienced intra-cell interference. In some cases, with respect to a physical downlink shared data channel (PDSCH), MUST can increase system capacity and improve user experience in certain scenarios. MUST may be more beneficial when the network experiences higher traffic loads. MUST may be more beneficial in user perceived throughput for wideband scheduling cases, as compared to subband scheduling cases. MUST may be more beneficial in user perceived throughput for cell-edge UEs as compared to other UEs.

In some cases, a MUST UE receiver is assumed to be capable of canceling or suppressing intra-cell interference between co-scheduled MUST users for at least three categories, for example: superposition transmission with an adaptive power ratio on each component constellation and non-Gray-mapped composite constellation (Category 1); superposition transmission with an adaptive power ratio on component constellations and Gray-mapped composite constellation (Category 2); and superposition transmission with a label-bit assignment on composite constellation and Gray-mapped composite constellation (Category 3). It is recognized herein that no uplink NOMA has been discussed in Rel-14 for LTE.

Current approaches to NOMA transmissions, for example small data transmissions using NOMA, lack capabilities and efficiencies. For example, current approaches to NOMA transmissions may reduce spectral efficiency or degrade channel estimation performance.

SUMMARY

Non-Orthogonal Multiple Access (NOMA) transmissions are described herein in which sequence collision is mitigated or eliminated by exploiting the randomness nature of user specific reference bits and data bits. Methods, systems, and devices are also described herein that may assist with small data transmission in new radio (NR). In an example, small data can be transmitted when a given user equipment (UE) is in an idle state or an inactive state.

An apparatus, for instance a network apparatus such as a gNB, can include a memory and a processor that can execute computer-executable instructions stored in the memory to cause the apparatus to configure contention-based radio resources for a physical uplink shared channel (PUSCH) so as to define a configured grant PUSCH. The apparatus can broadcast information to a user equipment (UE) so as to configure the configured grant PUSCH for the UE. Thereafter, the apparatus can receive small data transmitted from the UE via the configured grant PUSCH. Thus, a given UE can receive broadcast information that indicates contention-based radio resources for a physical uplink shared channel (PUSCH) so as to define a configured grant PUSCH. Based on the broadcast information, the UE can transmit small data via the configured grant PUSCH while remaining in an RRC-IDLE state or an RRC-INACTIVE state. The broadcast information can be broadcast in a remaining system information block. The broadcast information can include one or more non-orthogonal multiple access parameters (e.g., an indication associated with a demodulation reference signal port, a multiple access signature, and/or an interleaver), such that the configured grant PUSCH is configured with the one or more non-orthogonal multiple access parameters.

In another example, an apparatus may generate a plurality of reference bits based on an identity specific to the apparatus, and a multiple access identity. The apparatus may encode the plurality of reference bits with a plurality of information bits. The apparatus may use the encoded reference bits to generate a preamble or a demodulation reference signal. The apparatus may transmit a message using a time and frequency resource that is based on the preamble or demodulation reference signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended to only to be illustrative.

FIG. 23A is a block diagram that shows example functions for a reference bit assist data NOMA transmission for an orthogonal frequency-division multiplexing (OFDM) waveform.

FIG. 23B is a block diagram that shows example functions for a reference bit assist data NOMA transmission for a DFT-s-OFDM waveform.

DETAILED DESCRIPTION OF ILLUSTRATIVE EMBODIMENTS

Figure 1:
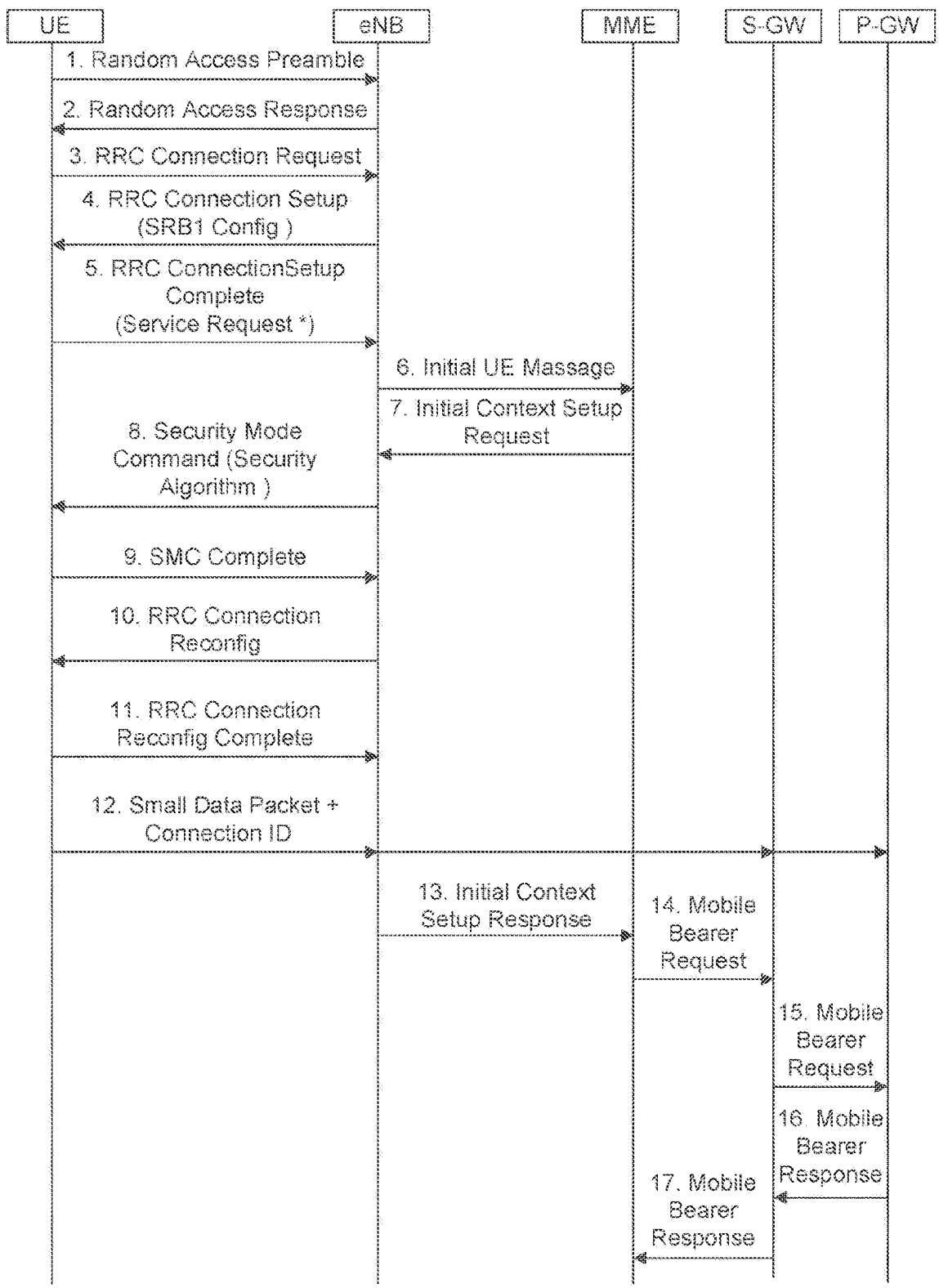
FIG. 1 is a call flow showing an example procedure for a UE-triggered Service Request.
Figure 2:
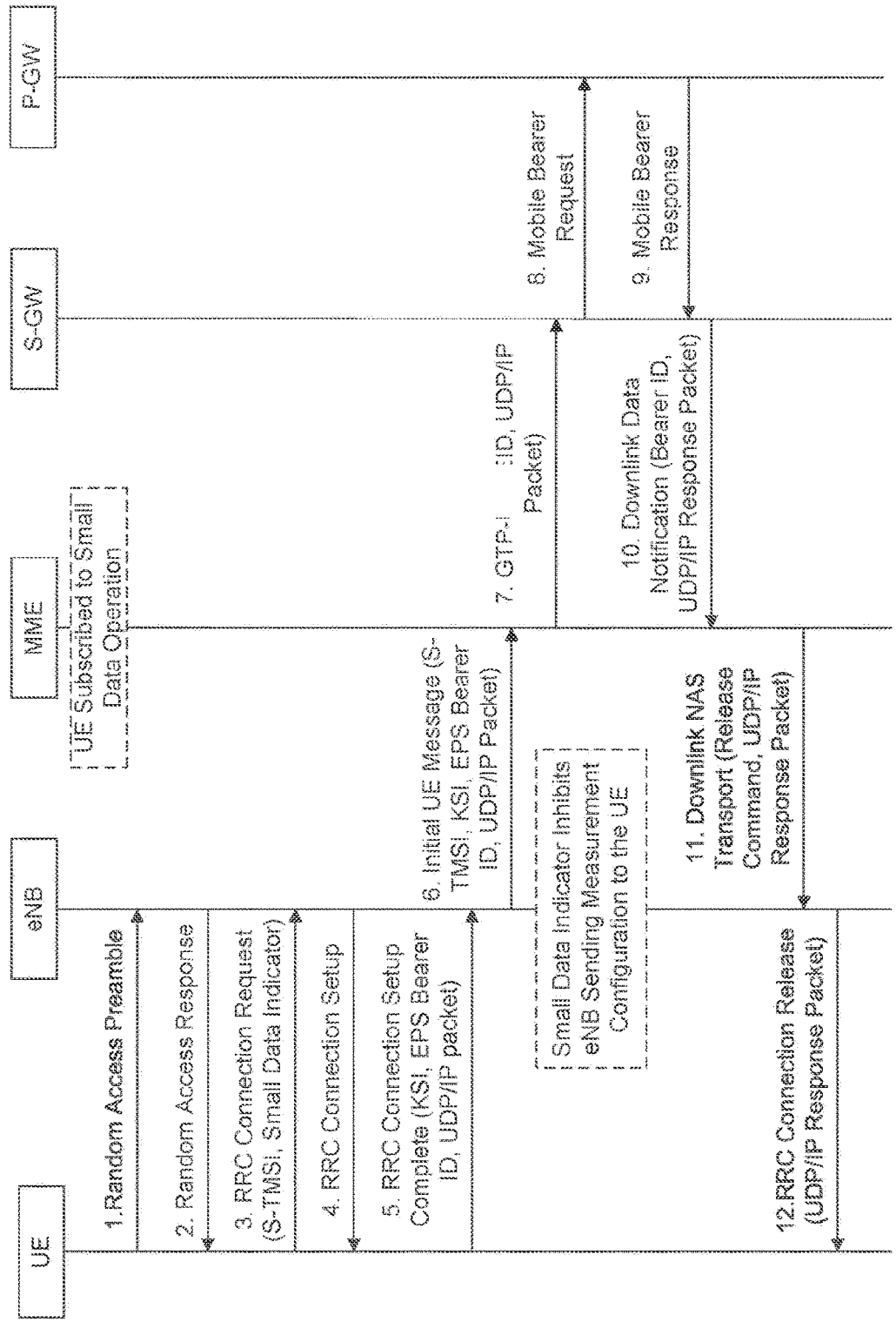
FIG. 2 is a call flow showing an example procedure for Mobile-Originated data transport in the control plane.
Figure 3:
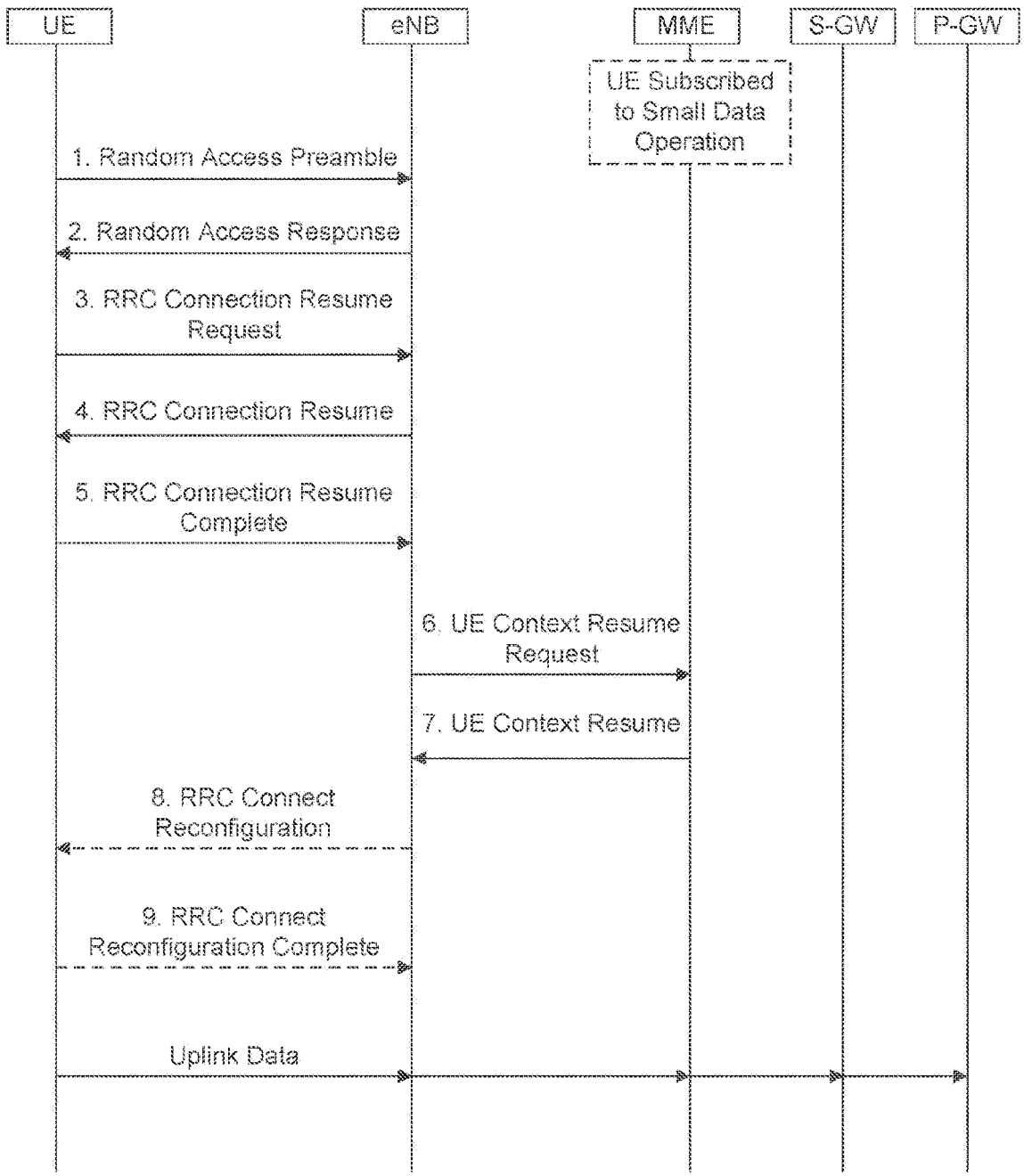
FIG. 3 is call flow showing an example procedure for Mobile-Originated Connection Resume in the user plane.
Figure 4:
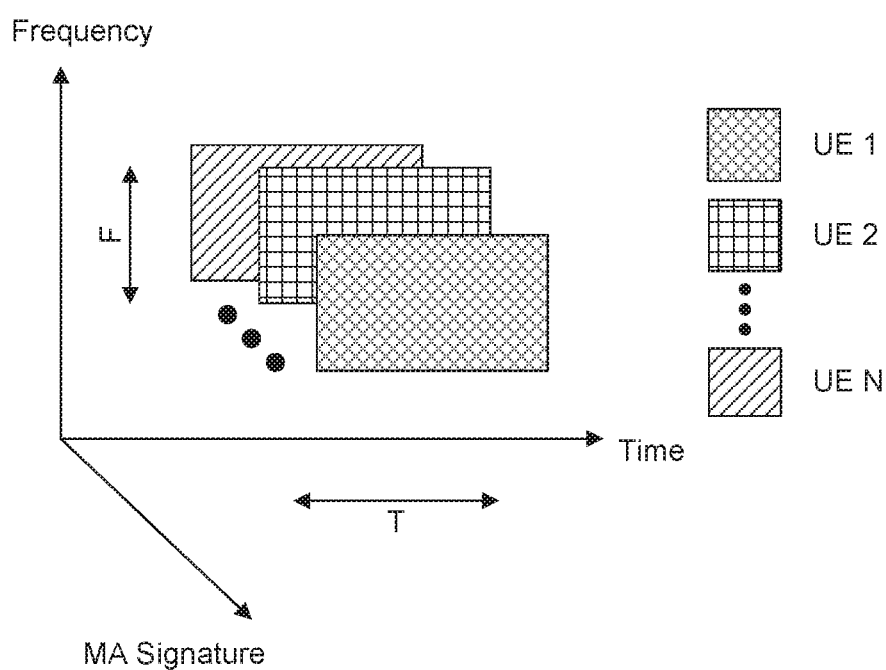
FIG. 4 depicts an example Non-Orthogonal Multiple Access (NOMA) scheme.
Figure 21:
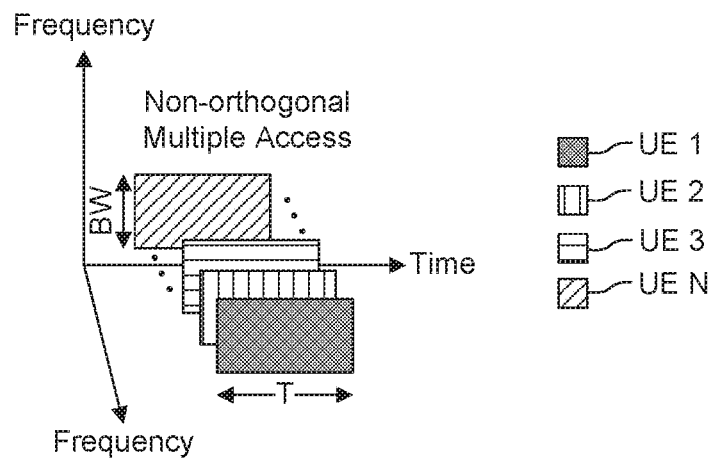
FIG. 21 depicts another example Non-Orthogonal Multiple Access (NOMA) scheme.

As an initial matter, new radio (NR) non-orthogonal multiple access (NOMA) schemes have mainly targeted uplink (UL) transmissions to support massive connectivity and to enable the newly defined grant-free transmission procedures with low latency and high reliability. Since multiple users are multiplexing at a given time-frequency resource in NOMA as shown in FIG. 4 and FIG. 21, for the evaluated scenarios, the results show significant benefit of non-orthogonal multiple access in terms of UL link-level sum throughput and overloading capability, as well as system capacity enhancement in terms of supported packet arrival rate at a given system outage. In an example, UL non-orthogonal multiple access may be implemented at least for mMTC. For non-orthogonal multiple access, there may be interference between transmissions using overlapping resources. As the system load increases, it is recognized herein that this non-orthogonal characteristic may be more pronounced. To combat the interference between non-orthogonal transmissions, transmitter side schemes, such as spreading (linear or non-linear, with or without sparseness) and interleaving may be employed to improve the performance and ease the burden of advanced receivers.

A difference between NOMA schemes is the multiple access (MA) signature used to enable the non-orthogonal transmission. Based on the MA signature used, the NR NOMA candidate schemes can be categorized as Codebook-based; Sequence-based; or Interleaver or scrambling-based. The codebook-based MA schemes are the direct mapping of each user's data stream into a multi-dimensional codeword in a codebook. Sequence-based MA techniques utilize non-orthogonal complex number sequences to overlap multi-user signals. In an interleaver-based MA system, through a user-specific bit-level interleaver, inter-user interference is suppressed by overlapped signal experiences. While the schemes in codebook-based and sequence-based spread data in small units using short codewords/sequences, the interleaver-based enables dispersion of data across a long signal stream.

In an example mMTC use scenario, benefits of adapting NOMA may include: provide higher connection density per physical resource with high overloading; and reduce latency, signalling overhead, and power consumption by enabling grant-free access.

In an example URLLC use scenario, the benefits of adapting NOMA may include: improve the efficiency of the resource utilization; provide higher reliability through diversity gain achieved by spreading and coding; enhance the robustness to collision by carefully design the MA signature; and provide the ability to multiplex mixed traffic types.

In an example eMBB use scenario, the benefits of adapting NOMA may include: efficient resource utilization; larger capacity region by non-orthogonal user multiplexing; robustness to fading and interference with code-domain design; and higher cell throughput and efficient link adaptation with relaxed CSI accuracy.

In LTE, an example small data transmission procedure (SDT uses the control plane (CP) for data transmission. To do that, the small data is piggybacked on Non-Access Stratum (NAS) messages to the MME, and then to the packet gateway, with the data transfer secured using an already established NAS context security credential. In a user plane (UP) approach, the transmission of small data uses the AS context (e.g., data radio bearer), for instance AS security context stored in the UE subsequent to the RRC connection suspension. It requires an initial RRC connection establishment that configures the radio bearers and the Access Stratum (AS) security context in the network and UE. When the UE transitions to the RRC idle state, the connection suspend procedure enables the UE to retain UE's context at the UE, eNB, and MME. Later, when there is new traffic, the UE can resume the connection. Both small data transmission options described above represent a reduction of higher layer signaling thus reduce the higher layer signaling overhead. It is recognized herein, however, that the current LTE system is basically connection-oriented. For example, the UE will transition from the RRC idle state to the connected state if there is a data transmission. When a UE in the idle mode has data to send to the base station (BS), the UE first initiates the random access (RA) procedure to make a connection. After the UE succeeds in the RA procedure, the UE moves to the connected mode, and then it can send data.

In new radio (NR), there may be a state transition from RRC in idle or inactive mode to RRC connected mode for example data transmissions. For example, in some cases, if a given user's data will come in a very short duration, then it is expected to increase the transition overhead because UEs need to perform frequent state transition upon the transmission of data. In order to save signaling overhead and UE power consumption, in certain situations, it is recognized herein that it may be desirable that UEs in RRC idle or inactive state transmit small UL data while avoiding or minimizing the overhead of the existing mechanism for the state transition to the RRC connected state. Thus, it is further recognized herein that mechanisms for saving power and reducing latency for small data transmission when the UE is either in RRC idle or inactivate mode may be desirable.

Figure 5A:
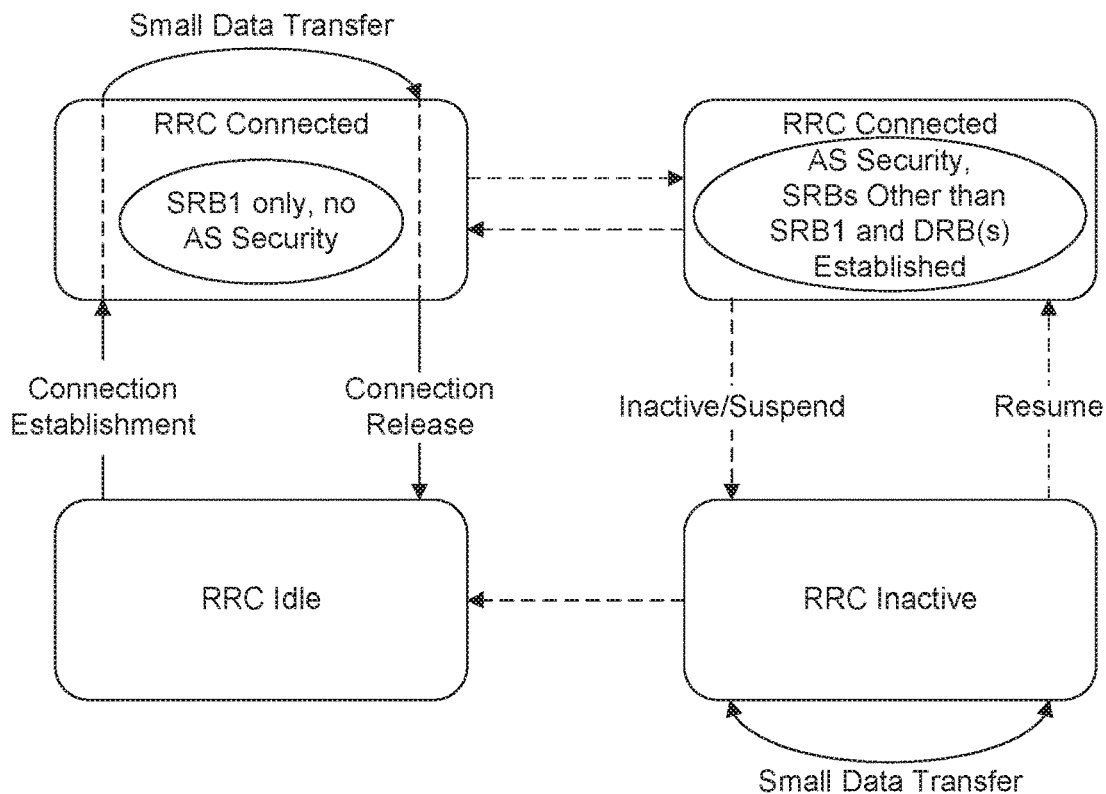
FIG. 5A illustrates an example of UE state transitions in which a small data transfer is performed when the UE is in the radio resource control (RRC) Inactive state.
Figure 5B:
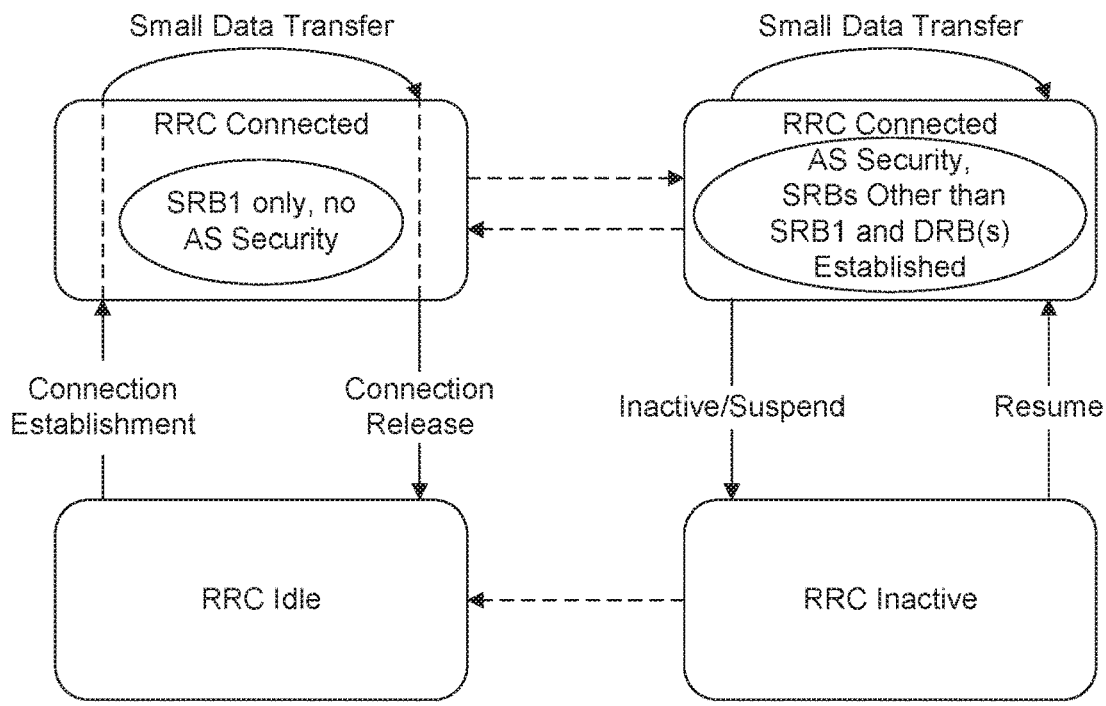
FIG. 5B illustrates another RRC state machine that includes example UE state transitions for performing small data transfers.

To address technical issues identified herein, in various examples, systems, devices, and methods are described for conducting small data transmissions using NOMA when a given UE is in an RRC idle or inactive state. In an example, the UE can transmit small data, wherein the UE in the RRC idle state transitions briefly to the RRC connected state for the small data transmission, which can be carried over SRB1 for example, without the need for AS security context establishment, SRB2/SRB3 establishment, or data radio bearers (DRBs) establishment. In an example in which a given UE is in the idle mode with NAS security context stored, the UE may use configured grant resources for small data transmission, transition to the RRC connected state, securely transmit data using the NAS security credential, and return back to RRC idle state, for example autonomously or upon a network-initiated connection release procedure, without having to perform AS security activation procedures, measurement configuration procedures, or RRC Reconfiguration procedures in support of the establishment of radio bearer other SRB1 (e.g., SRB2 or SRB3 or DRBs). In another example in which a given UE is in the inactive mode with the AS security context being stored, if there is small data for transmission, the UE may transmit small UL data without necessarily performing a state transition from the RRC inactive state to the RRC connected state (e.g., see FIG. 5A), or may transition first to the RRC connected state and transmit the data (e.g., see FIG. 5B).

For NOMA with grant-free transmissions, a demodulation reference signal (DM-RS) can serve multiple purposes at the same time. For example, the DN-RS can server UE activity detection and channel estimation. As DM-RS can be transmitted by active UEs for data demodulation, it can be used as an indicator of UE activity, and as an indicator of the MA signature if the association between the DM-RS and MA signature is known. As more UEs may be supported for grant-free NOMA transmission, it is recognized herein that the number of existing orthogonal DM-RS ports in NR may be less than the number of potential UEs. To address this issue, in some cases, an extended orthogonal DM-RS or non-orthogonal DM-RS ports can be used to enlarge user connectivity. It is recognized herein, however, that extended orthogonal DM-RS and non-orthogonal DM-RS present various issues. By way of example, extended orthogonal DM-RS ports can increase the number of multiplexing users without sacrificing channel estimation performance for user activity detection and multiuser detection, but it may require more orthogonal DM-RS ports (resources) to be allocated, thereby reducing the spectrum efficiency. By way of another example, non-orthogonal DM-RS ports can save DM-RS ports resources by allowing overlapping of DM-RS, but it may, in some cases, degrade the channel estimation performance because there is a trade-off regarding the preamble/DM-RS average cross correlations.

For contention grant-free transmission in which UEs may perform random resource selection, it is recognized herein that the random selection of MA resources may lead to potential collision of DM-RS and other MA signature among the UE specific MA signatures, which could severely degrade system performance, for example, for scenarios requiring high traffic loading. The collision probability may be impacted by the resource pool size, such as DM-RS ports, preambles or MA signatures. For instance, if two or more UEs select the same preamble or DM-RS sequence, there may at most one preamble ID detected, which means that only one UE has the chance to be detected. Furthermore, the corresponding channel estimation will be the combination of multiple UEs, which may lead to significant performance degradation due to the non-resolvable interferences. When there is false alarm or miss detection due to collision, in some cases, it has the most significant impact on the performance of NOMA with grant-free transmission. Hence, it is recognized herein that reducing the collision probability is a desired design factor for NOMA transmission scheme.

In accordance with an example embodiment, the issues mentioned above are addressed with a NOMA transmission in which sequence collision is mitigated or eliminated by exploiting the randomness nature of user specific reference and data bits. For example, UE-specific reference bits may be appended with information bits for low density parity coder (LDPC) encoding, and both reference bits and information bits may also be encoded. UE-specific reference bits can be constructed via a low-correlation binary sequence. A (Binary) M-sequence may be constructed and initialized with a UE-specific ID. A (Binary) Gold-sequence may be constructed and initialized with a UE-specific ID. The low-correlation binary sequence may be a sparse sequence. In an example, UE-specific reference bits can be constructed with a sparse sequence. In some cases, the UE-specific reference bits can enhance the NOMA performance because both reference bits and information bits are also encoded.

In an example, UE-specific reference bits can be used as a preamble or a DM-RS for transmission because UE-specific reference bits are unique for each UE, thereby eliminating the collision of transmitted preamble among users. UE-specific reference bits can be used for, for example and without limitation, user activity detection, or MA signature (i.e., UE-specific interleaver) indicators. In an example, a UE-specific interleaver may be applied for the encoded bits (excluding the reference bits) for randomization to combat multiuser interference. A rate-matcher may be applied for the interleaved bits for rate-matching by repeating the interleaved bits, or puncturing the interleaved bits. UE-specific reference bits and rate-matched bits may be modulated with symbol modulators. Super position coding can be applied in the symbol modulation. In some cases, the modulated symbols can be spread with a spreading sequence, which may be robust with asynchronous transmissions, and may increase spreading gain and boost SNR.

In an example, reference bits assist data NOMA transmission includes reference bits and information bits that are jointly encoded. UE-specific reference bits and information bits may be jointly encoded with a systematic low-density parity coder (LDPC). Based on the property of the systematic LDPC, the encoded bits may contain the reference bits, information bits, and parity bits. The reference bits can be used as DM-RS or preamble for transmission, thus it can reduce the resource overhead and enhance the spectrum efficiency because (either as DM-RS or preamble) is reused from partial of encoded bits. When the reference bits are used as DM-RS, it can be designed as orthogonal or non-orthogonal based DM-RS. When the reference bits are used for preamble, the preamble can be based on a low-correlation or orthogonal sequence. It is recognized herein that the above-described example can achieve higher overloading because the performance is not restricted by preamble or DM-RS collisions. UE-specific reference bits can be used as a preamble for NOMA transmission, thus the receiver can detect the preamble for identification of UE activity. UE-specific reference bits can be used for MA signature (i.e., UE-specific interleaver) indicator. UE-specific reference bits may be jointly encoded with information in the LDPC. This can enhance LDPC decoding performance. Part of UE-specific reference bits can be constructed from a UE-specific ID. This UE-specific ID value can adopt C-RNTI or a pre-configured unique ID.

The described-herein NOMA transmission schemes may be constructed by various components, such as by using, for example and without limitation, reference bits insertion (where reference bits are appended with information bits for jointly encoding); a systematic LDPC encoder; bit-level processing, symbol level processing, and resource element (RE) mapping. Bit-level processing may include, for example and without limitation, UE-specific interleaver and Rate matching. Symbol-level may include, for example and without limitation, symbol modulation for interleaved bits and parity bits, where parity bits are constructed from the reference bits and information bits; Symbol spreading for the UE-specific interleaved bits; and Preamble generation.

Turning now to small data transmissions while the UE is in the idle state, in accordance with an example embodiment, a NOMA transmission scheme for small UL data transmission in the RRC idle state may reduce UL data transmission latency and UE power consumption. In some examples, the UE can originate the small data transmission while Non-Access Stratum (NAS) security context is established between the UE and the Access and Mobility Management Function (AMF). A NAS security context may be established for the UE in the AMF while the attach procedure succeeds, and a default bearer may be established between the UE and the packet data network (PDN) gateway. The small data may be encapsulated with or without a NAS signaling message, and sent to the AMF. In some cases, the small data transmission procedure might not apply Access Stratum (AS) security, and there might be no RRC reconfiguration, which represents a reduction of signaling messages over the radio interface.

Figure 6:
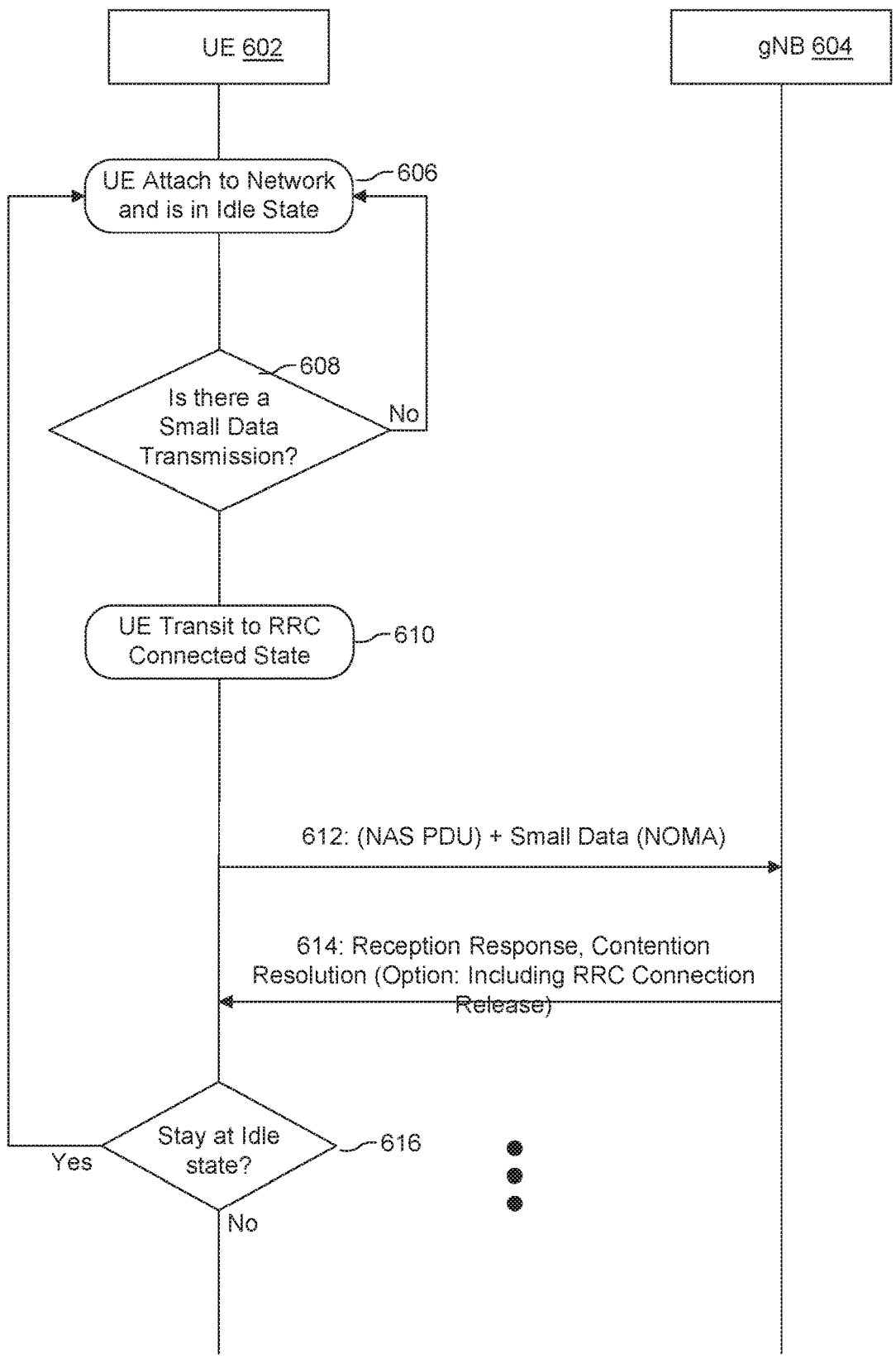
FIG. 6 is a flow diagram that includes example signals for a UE to transmit small data while in the RRC idle state, in accordance with an example embodiment.

Referring to FIG. 6, an example UE 602 attaches to a network and is in the idle state, at 606. At 608, the UE 602 determines whether it needs to make a small data transmission to a network node, such as an gNB 604. If the UE 602 does not need to make a small data transmission, it returns to 606 and remains in the idle state. If the UE 602 needs to make a small data transmission, it proceeds to 610, where the UE 604 transitions to the RRC connected state. While in the RRC connected state, the UE sends its small data to the gNB 604, at 612. At 614, the gNB 604 sends a reception response back to the UE 602. The response that is received by the UE 602 may include a contention resolution. In some examples, the response may include an RRC connection release message, thereby returning the UE 602 to the idle state. At 616, the UE 602 determines whether it can remain in the idle state. Thus, as illustrated above, the small data transmission may be sent by the UE 602 without waiting for the contention-based random access (RA) response. For example, the small data may be sent via a configured grant.

Figure 7:
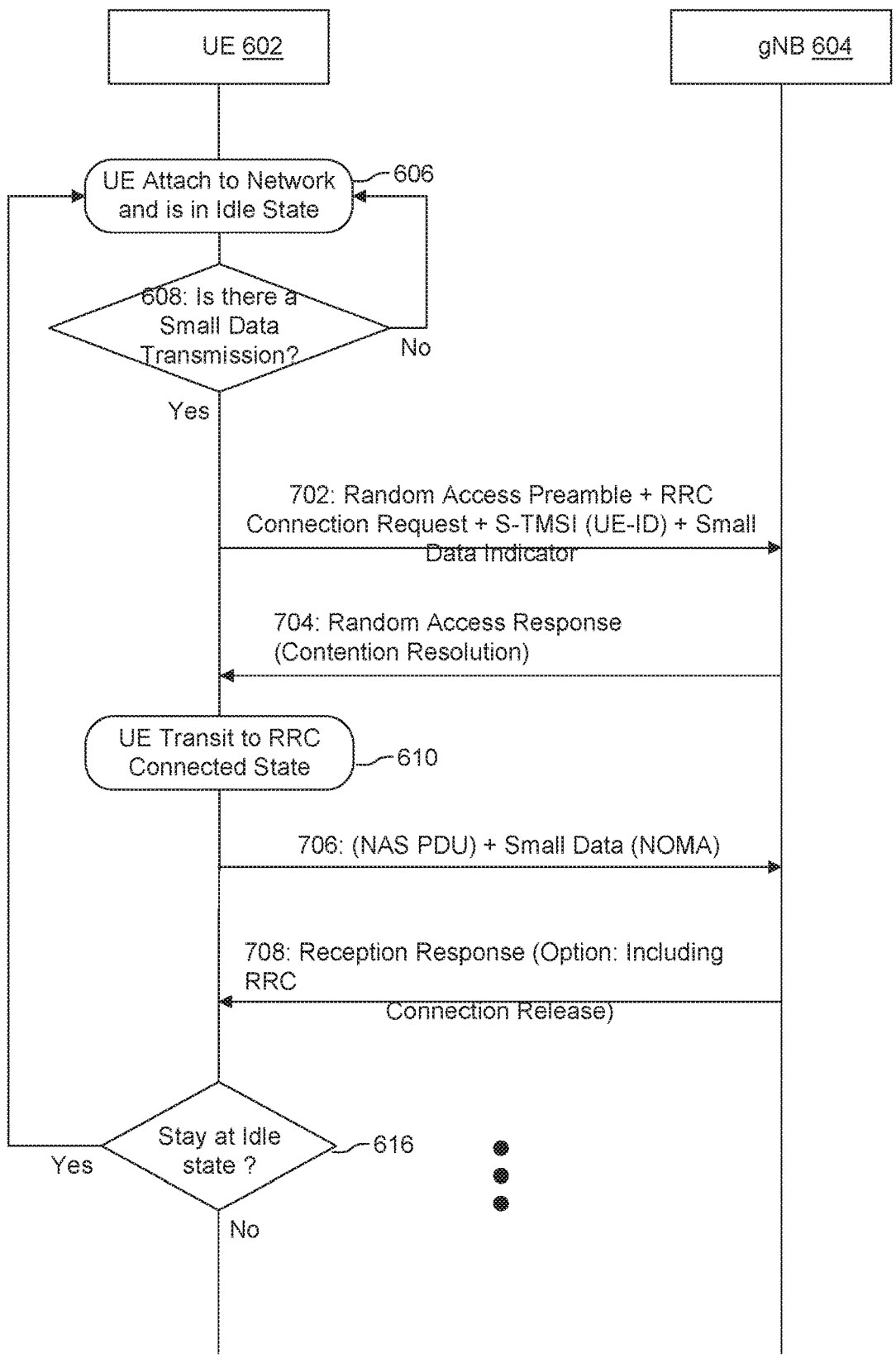
FIG. 7 is another flow diagram that includes example signals for a UE to transmit small data while in the RRC idle state, in accordance with another example embodiment.

FIG. 7 illustrates another example embodiment for transmitting small data while the UE 602 is in the idle state. As shown in FIG. 7, the random access (RA) procedure is performed first (at 702 and 704), and once the contention resolution and RRC connection (at 610) complete, then the UE 602 can transmit the small data in the configured grant Physical Uplink Shared Channel (PUSCH), at 706.

With continuing reference to FIGS. 6 and 7, the transmission of small data by the UE 602 while the UE 602 is in the idle mode may use a data channel over a radio resource configured by the gNB 604. Referring in particular to FIG. 6, the gNB 604 may configure contention-based radio resources for a PUSCH (CFG-PUSCH) and broadcast the information via a remaining system information block (RMSI or OSI). The configured grant radio resource (CFG-PUSCH) may be configured with NOMA operation parameters. If no NOMA operation parameter is set with the CFG-PUSCH, the UE 602 can use OMA to transmit the small data. Example NOMA operation parameters include demodulation reference signal (DMRS) ports, multiple access signatures (MA-signatures) such as spreading sequence, interleaver, etc. Referring in particular to FIG. 7, in accordance with another example, at 702, the UE 602 may use an RA preamble in the procedure for the RRC connection request. At 706, the UE 602 sends the small data packet in the configured grant PUSCH payload. The gNB 604 may forward this packet to the AMF so that it may authenticate the UE 602 by decoding the packet with the UE security context stored during the attach procedure. The payload may include, for example, a header, data packet or NAS signaling data (e.g., NAS PDU). The header can include the UE identity (e.g. S-TMSI, IMSI), small data indicator (SDI), and/or last packet indicator (LPI). The AMF may forward the authenticated data packet to the gateway.

Referring to the example illustrated in FIG. 6, the header can include the UE identity (e.g., S-TMSI, IMSI), small data indicator (SDI), and/or a last packet indicator (LPI). The AMF forward the authenticated data packet to the gateway. Referring to the example illustrated in FIG. 7, the UE-identity, SDI, and/or the RRC connection request (cause) can be sent with RA preamble, at 702. At 702, the UE-identity, SDI, and RRC connection request can also send in a configured-grant PUSCH with RA preamble with TDM or FDM. In some cases, the configuration (e.g., time-frequency resource, DM-RS, NOMA operation parameters (if apply) etc.) of configured-grant PUSCH for carrying UE-identity, SDI, and RRC connection request can be broadcast via RMSI or OSI. Once the UE 602 receives the RA response with contention resolution and timing advance value (TA), then the UE 602 can send the small data with or without the Non-Access Stratum Protocol Data Unit (NAS-PDU) in CFG-PUSCH. For example, at 704, the RA response (DCI) also can indicate which CFG-PUSCH (resource) for the UE 602 to transmit the small data.

In some examples, the UE or AMF can trigger the establishment of the user plane bearers between the eNB during data transmissions in the control plane (CP). For example, if the size of the data transferred with the CP exceeds a limit, the AMF can initiate this procedure. In some cases, this change of functionality implies the release of the specific CP user plane bearer between the AMF and SMF, the establishment of the user plane bearers, and the setup of the AS context security.

When a given UE transmits small data in the idle state, the NAS signaling message may encapsulate with the data packet. The small data indicator (SDI) may include an indication for a small data packet that is encapsulated with the NAS-PDU. In an example, if the UE sets the last packet indicator (LPI) field to indicate that a given packet is the last packet for transmission, then the LPI may allow the UE to notify the AMF that no further uplink or downlink data transmissions are expected, or only a single downlink data transmission subsequent to this small data transmission is expected, for example. In some cases, the UE may transmit an IdleStateConfiguredGrantData message in the message part of the small data transmission when the UE is in idle state. An example IdleStateConfiguredGrantData message that can be used in the illustrated example of FIG. 6 when the UE is in idle state is shown below:

Example IdleStateConfiguredGrantData Message for RRC Idle State

```
-- ASN1START
IdleSatteConfiguredGrantData ::=    SEQUENCE {
    ue-Identity                         UE-Identity,
    smallDataInd                        BIT STRING,
    lastPacketInd                       BIT STRING,
    dataUnit                            OCTET STRING (SIZE N)
}
UE-Identity                         CHOICE {
    sTMSI                               BIT STRING (SIZE(16)),
    mTMSI                               BIT STRING (SIZE(32)),
    imsi                                BIT STRING (SIZE(12)),
}
-- ASN1STOP
```

Turning now to radio resource allocation, time and frequency radio resource for a configured grant PUSCH may be semi-persistently assigned by a parameter given in the IdleStateConfiguredGrantConfig parameters. IdleStateConfiguredGrantConfig may include the following parameters shown in Table 1, which are shown by way of example and without limitation.

TABLE 1

Example information elements in IdleStateConfiguredGrantConfig

| Example Information Element | Example Usage |
| --- | --- |
| timeDomainAllocation | Indicates slot offset, the 1st symbol at a time slot for CFG-PUSCH transmission and the length |
| frequencyDomainAllocation | Indicates PRB location within the (initial) BWP. |
| Number of PRBs and numerology | Number of allocated PRB and subcarrier spacing |
| Transmission periodicity | 1 ms, 2 ms, 4 ms, etc. |
| DMRS configuration | Uplink DMRS port configuration parameter |
| CP configuration | Cyclic prefix length (type) |
| Guard band configuration | Number of NULL subcarriers for guard band |
| NOMA parameter | MA-signature parameter |

The parameter timeDomainAllocation in IdleConfiguredGrantConfig can indicate a combination of a start symbol and the length for CFG-PUSCH. Frequency domain resource allocation for this configured grant PUSCH may be determined by the higher layer parameter frequencyDomainAllocation, which may indicate the PRB location within the initial BWP. In some cases, transmission periodicity indicates the next available transmission opportunity. The gNB may configure multiple configured grant (or grant-free) resources for configured-grant PUSCH transmissions. Different configured grants may configure with different transmission periods because, for example, the gNB may be able to use the status of DRX or a power saving mode (PSM) timer to predict a set of UEs that intend to transmit.

Figure 8:
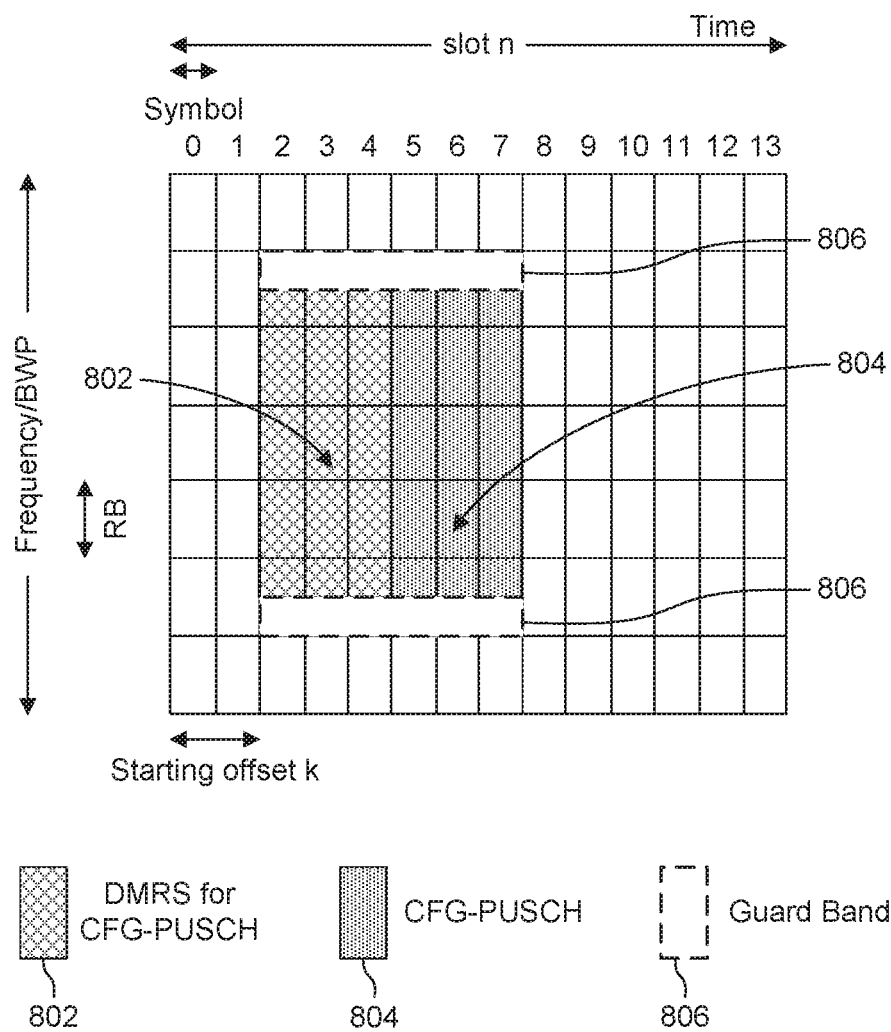
FIG. 8 depicts example frequency-time resources of an example configured grant physical uplink shared channel (PUSCH) (CFG-PUSCH) transmission.

Referring to FIG. 8, a guard band 806 can be used for the edges of the configured frequency resources, for example the edges of a CFG-PUSCH 804 and a DMRS 802, to further mitigate inter-(sub)carrier interference (ICI) due to asynchronous transmission. In addition, in some cases, the DMRS 802 needs to maintain orthogonality when timing advance (TA) information is not available at the UE.

Figure 9:
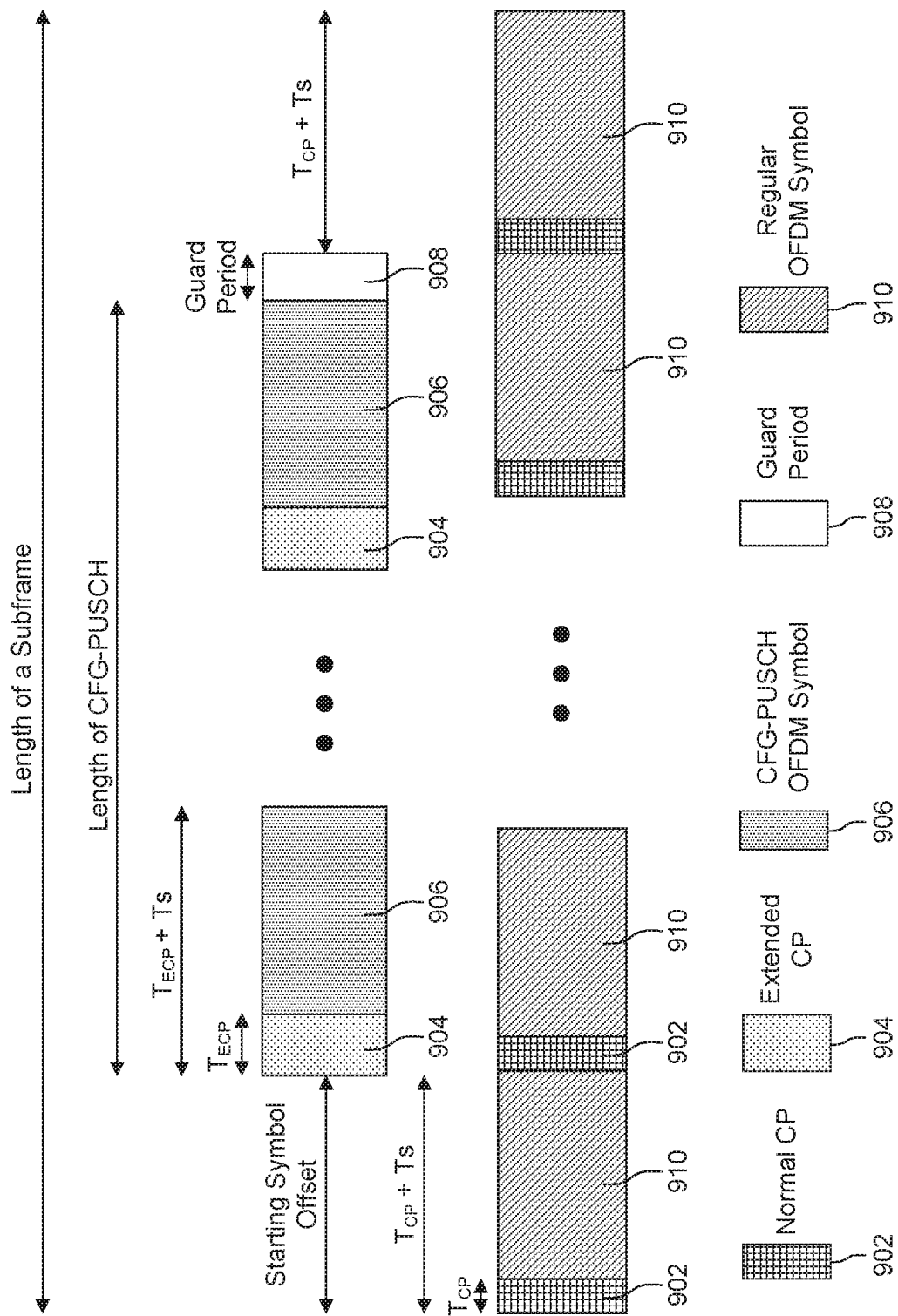
FIG. 9 depicts example CFG-PUSCH orthogonal frequency-division multiplexing (OFDM) symbols with an extended control plane (CP), in accordance with an example embodiment.

Referring now to FIG. 9, an extended CP 904 ($T_{ECP}$), which is longer than a normal CP 902, or zero-padding samples (e.g., guard period 908), may be applied for the OFDM symbols 906, to support asynchronous transmission. The duration of $T_{ECP}$ (extended CP 904) can be varied with different numerologies or frequency bands. The duration of $T_{ECP}$ may be specified during CP configuration. Example durations of $T_{ECP}$ are shown in Table 2 below.

TABLE 2

Example durations of $T_{ECP}$ with different numernologies

| Numerology (μ) | 0 | 1 | 2 |
| --- | --- | --- | --- |
| Subcarrier Spacing | 15 Khz | 30 Khz | 60 Khz |
| $T_{ECP}$ (μs) | 9.38 | 4.68 | 2.34 |

Still referring to FIG. 9, at the end of the CFG-PUSCH OFDM symbol 906, a guard period 908 may be attached to mitigate the ISI due to asynchronous transmission. The length of the guard period 908 can be calculated based on the number of allocated PUSCH OFDM symbols $T_s$ and the duration $T_{ECP}$. In the example depicted in FIG. 9, the length of CFG-PUSCH is equal to 12 of the regular OFDM symbols 910 having normal symbol duration, i.e., the time duration $12(T_s+T_{ECP})$. The starting symbol offset is set to 1 (symbol) for this example.

In certain deployment scenarios, such as small cell for example, the TA acquisition might not be necessary and normal CP 902 may be used for CFG-PUSCH OFDM symbol transmission. FIG. 9 shows the CFG-PUSCH OFDM symbol 906 with extended CP 904.

In some cases, DMRS may be used for UE activity detection in UL configured grant transmission. Because multiple UEs may compete with one another at the same time-frequency resource, the collision of UEs may occur and it may potentially degrade the data detection performance.

The presence of a DMRS port can depend on various conditions. For example, in some cases if the allocated time-domain resource L-symbols (PUSCH symbols duration) are smaller than a predefined value $L_0$ (i.e., $L \leq L_0$), then the UE may assume that there is no DMRS extension. For example, if $L_0=4$ then there is no DMRS extension for 2-symbol and 4-DMRS symbols. In an example, the orthogonal DMRS ports with extra DMRS symbols may be configured by a higher layer parameter UL-DMRS-max-len (DMRS Length). Additional DMRS may be supported. An orthogonal cover code may be applied to DMRS symbols. For example, if parameter UL-DMRS-max-len is equal to 3 or 4, then UL-DMRS-max-len=3 and the time-domain orthogonal code $w_t(l)=(\{1\ 1\ 1\}\ \{1e^{j2\pi/3}\ e^{j2\pi2/3}\}$ and $\{1\ e^{j2\pi2/3}\ e^{j2\pi/3}\})$ for DMRS multiplexing. If UL-DMRS-max-len=4, then the time-domain orthogonal code $w_t(l)=(\{1\ 1\ 1\ 1\}\ \{1\ 1\ -1\ -1\}\ \{1\ 1\ -1\ -1\}$ and $\{1\ -1\ -1\ 1\})$ for DMRS multiplexing.

An example of an extended DMRS configuration is shown in Table 3. In this example, the dms-Type and DMRSLength parameters are used for the configuration of a DMRS extension.

TABLE 3

Example of DMRS configuration for CFG-PUSCH

| | ENUMERATED | |
| --- | --- | --- |
| dmrs-Type | {type1, type2, type 3, type 4, ... } | DMRS ports allocation |
| dmrs-AdditionalPosition | ENUMERATED {pos0, pos1, pos2, pos3} | DMRS additional position configuration is dependent on dmrs-Type and DMRSLength |
| DMRSLength | ENUMERATED {len1, len2, len3, len4, ... } | len3 = 3 DMRS symbols and len4 = 4 DMRS symbols |

Figure 10:
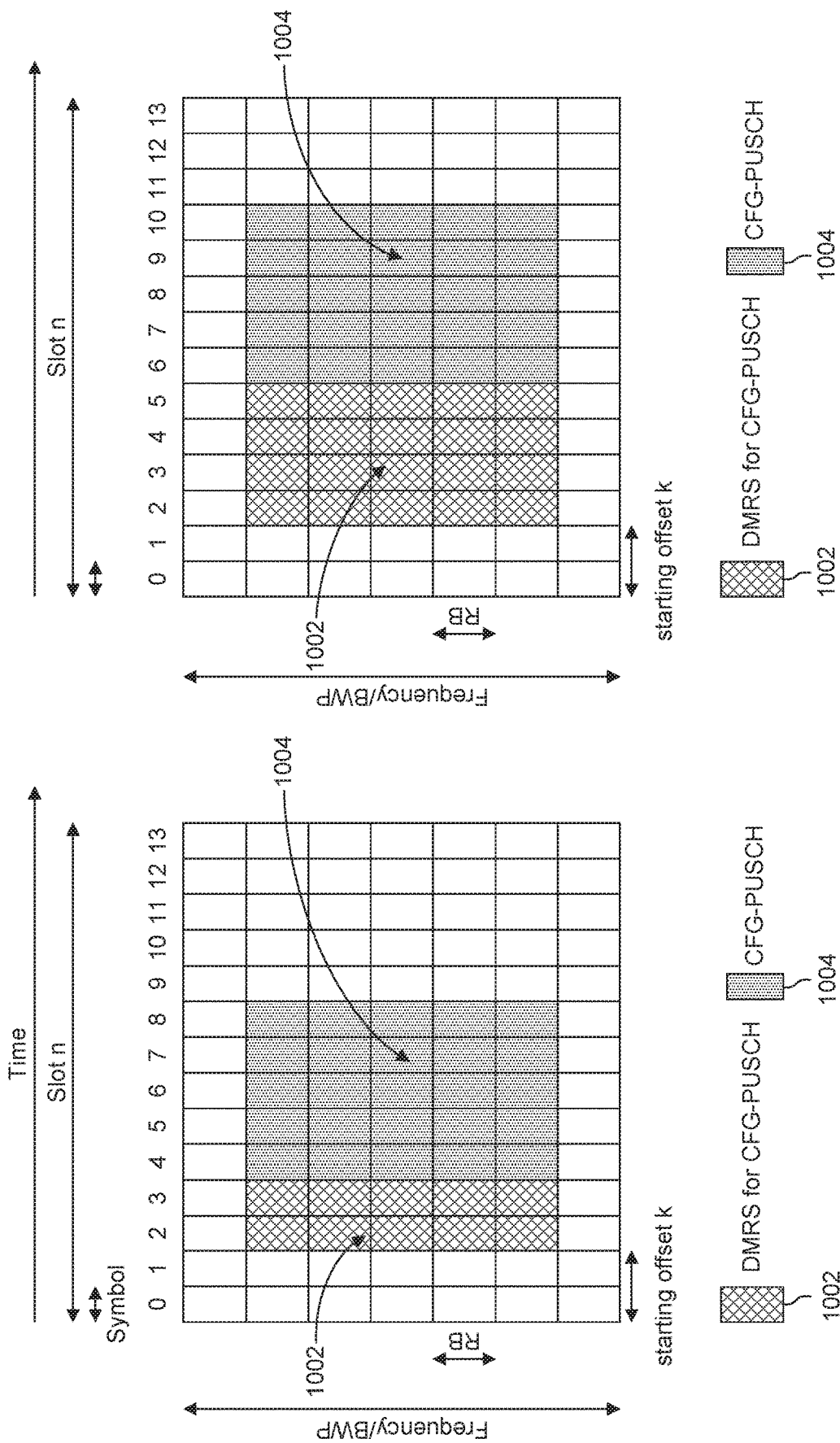
FIG. 10A depicts an example transmission format for CFG-PUSCH with 2 front-load demodulation reference signal (DMRS) symbols.
FIG. 10B depicts an example transmission format for CFG-PUSCH with 4 front-load DMRS symbols.

Referring now to FIGS. 10A and 10B, the gNB may configure the number of front-load DMRS symbols 1002 with DMRS length parameters. In FIG. 10A, the example gNB configures DMRS length=2. In FIG. 10B, the example gNB configures DMRS 1002 length=4. Thus, FIGS. 10A and 10B illustrate different transmission formats for CFG-PUSCH 1004 with different number of front-load DMRS 1004 and payload symbols.

By way of example, suppose DMRS is constructed by a gold sequence; where the gold sequence g(n) may be specified as follows:

$$g(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_c$ is a constant (e.g.=1600) and the operator "+" is the modulo-2 addition. The $x_1$ and $x_2$ are polynomial generator with length 31. The sequence initialization for gold sequence is given by:

$$c_{init} = (2^{17}(14n_s + l + 1)(2N_{ID}^{nSCID} + 1) + 2N_{ID}^{nSCID}) \mod 2^{31},$$

where $N_{ID}^{nSCID}$ denotes the scrambling ID for DMRS, $n_s$ is the slot number and l is the OFDM symbol number in a slot. When the UE is in the idle state, let $N_{ID}^{nSCID} = N_{ID}^{Cell}$, where $N_{ID}^{Cell}$ denotes the Cell ID. Although UEs may use the same scrambling ID, a set of DMRS ports and multiple access signatures (MA-signatures) may be allocated for UEs to reduce the collision probability. MA-signatures may be configured during the NOMA configuration. In an example, a table may define the mapping rule for mapping DMRS ports (e.g., a cell-specific DMRS port) to MA-signatures. An example of DMRS ports mapped to MA-signatures is illustrated in Table 4 below.

TABLE 4

Example of DMRS ports mapped with MA-signatures

| DMRS Port ID | MA-signature |
| --- | --- |
| 0 | 0 |
| 1 | 1 |
| ... | ... |
| N | M |

In some examples, a given UE may randomly select a DMRS port and look up a table for MA-signature mapping. A given gNB can perform UE activity detection based on identifying the active DMRS port (which can be identified based on receive power in the DMRS port), then perform the decoding based on the mapping between the identified DMRS port and MA-signature.

If the DMRS port and MA-signature mapping are not specified, in some examples, the UE may choose the DMRS port and MA-signature independently, and the gNB may still be able to perform UE activity detection. For example, the gNB can perform UE activity based on the active DMRS port, and then do blind decoding for each assigned MA-signature.

In some examples, a UE may be configured with a single or multiple sets of granted radio resources. The periodicity of each configured grant radio resources may be configured as the same or different. For example, a given UE may be configured with two granted radio resources with transmission periods for CFG-PUSCH transmission because, for example, the gNB may know when a certain UE is going to wake up for transmission while the UE is in the RRC idle state. The list of UEs may be enabled by broadcast information for configured grant transmissions. For example, the UE may use the broadcast, such as Access Barring (AB) information in the broadcast, and use its ID to retrieve the transmission resource allocated to it through a function. Setting up multiple CFG-PUSCH radio resources may also support different message sizes. For example, different message sizes may be dependent on different request causes or the NAS-PDU.

Figure 11:
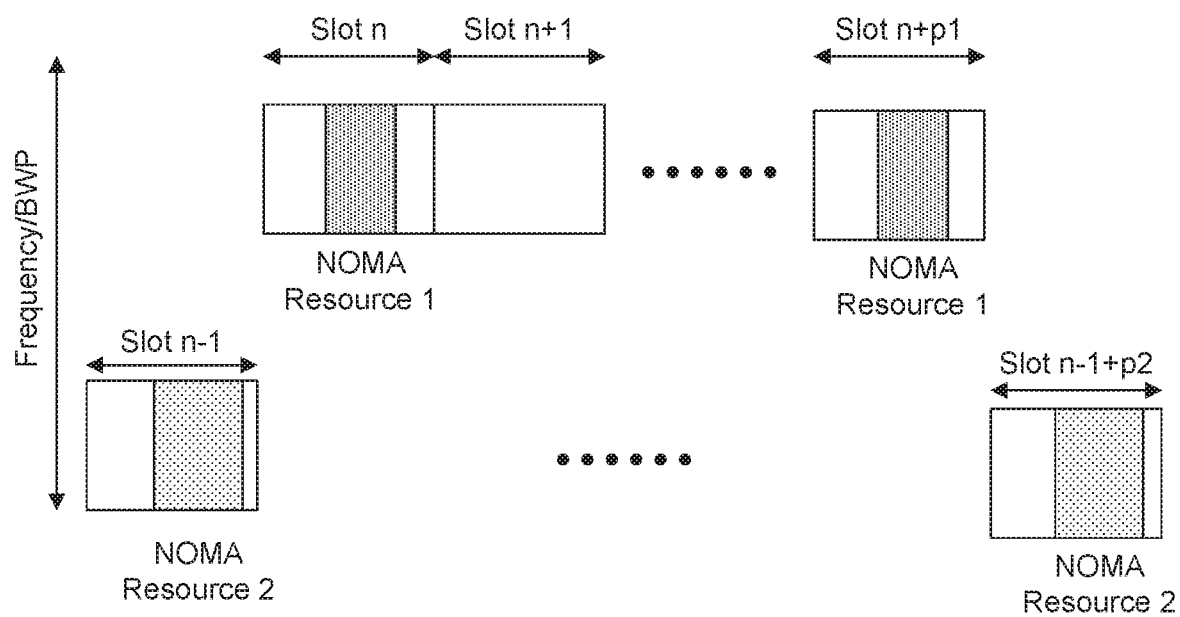
FIG. 11 illustrates an example for configuring multiple CFG-PUSCH resources.

A selection rule for a UE that defines which configured grant resource is chosen for CFG-PUSCH transmission may depend on transmission payload size. By way of example, suppose there are two configured grant radio resources, wherein the first configured radio resource is assigned with a set of cell-specific DMRS port IDs and cell-specific MA signature pair IDs={{7, 1}, {8, 2}, {9, 3}, {10, 4}, {11, 5}}, and the second configured grant is assigned with a set of DMRS port IDs and cell-specific MA signature pair ID={{7, 6}, {8, 7}, {9, 8}, {10, 9}, {11, 10}}. In the example, the first configured grant resource may support a message size of up to 72 bits, and the second set grant may accommodate more than 72 bits, to 96 bits. Continuing with the example, if the UE originated a small data transmission and encapsulated it with a NAS-PDU, and the total message size is 72 bits, then the UE chooses the first configured grant radio resource for the CFG-PUSCH transmission. FIG. 11 illustrates an example of configuring multiple CFG-PUSCH resources.

Figure 12:
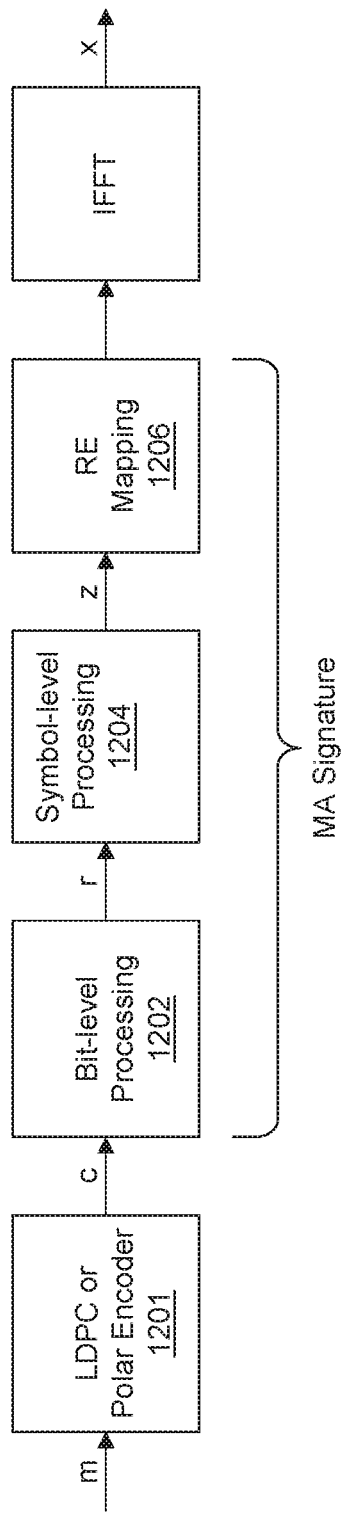
FIG. 12 illustrates an example functional flow for grant-free PUSCH transmissions using NOMA.
Figure 13:
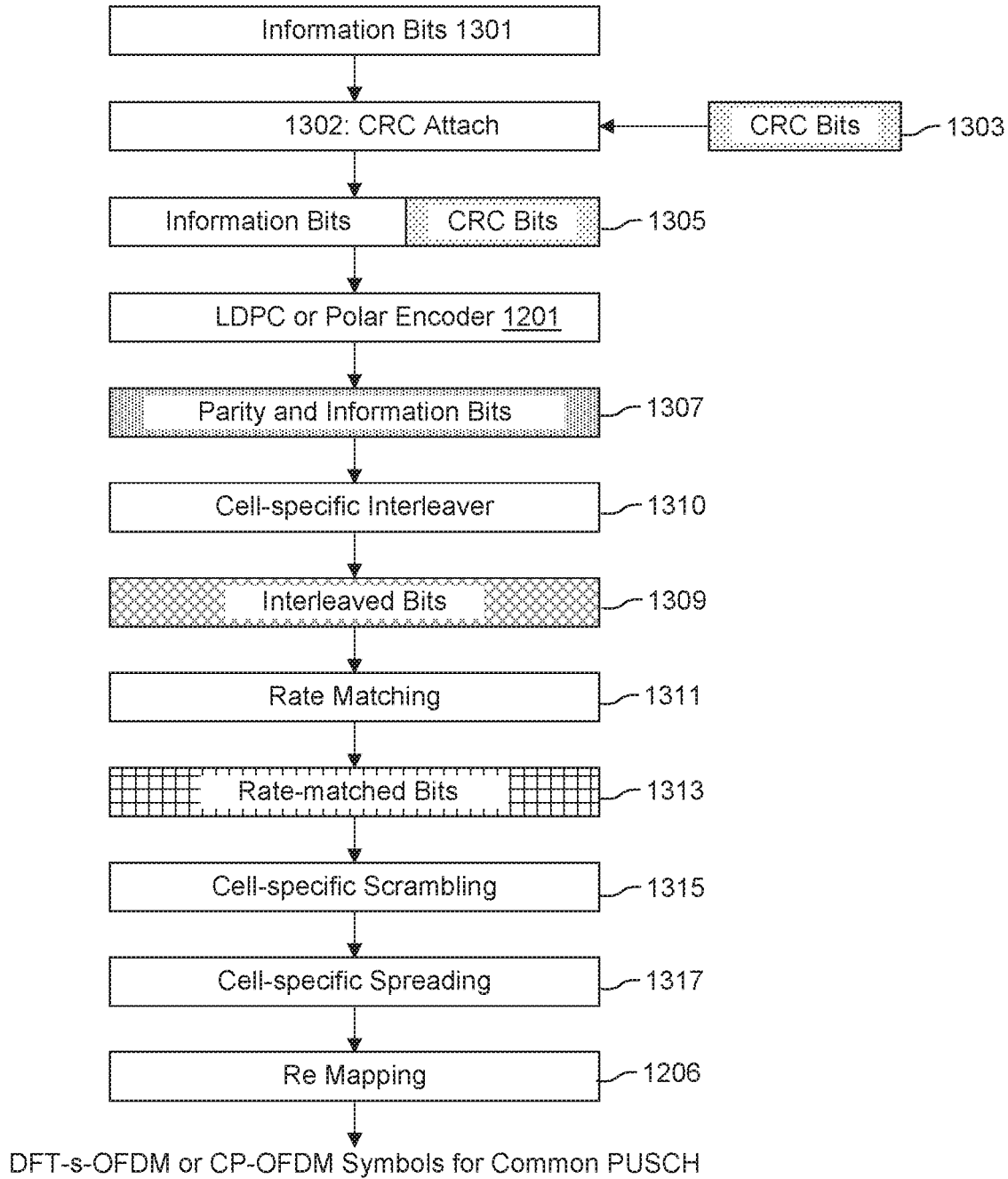
FIG. 13 is an example flow diagram for transmissions for grant-free PUSCH, using NOMA.

Referring now to FIG. 13, an example CFG-PUSCH may multiplex with a random access (RA) preamble in a time division multiplexing (TDM), frequency division multiplexing (FDM), or combination of TDM and FDM fashion. The configured grant PUSCH may be transmitted using a NOMA scheme, as shown in FIG. 13. In an example, the gNB configures the set of cell-specific parameters (cell-specific MA signatures) that enable the transmitter/receiver to modulate/demodulate and encode/decode a grantless data transmission as the signature of transmission. Referring to FIG. 12, the MA-signature may consist of multiple function blocks, such as a bit-level processing block 1202, a symbol-level processing block 1204, and a resource element (RE) mapping block 1206. Referring also to FIG. 13, the bit-level processing block 1202 may include a cell-specific interleaver 1310 and a rate matching module 1310. The symbol-level processing block may include a cell-specific scrambling module 1315 and a cell-specific spreading module 1317. FIG. 12 illustrates an example of grant-free PUSCH using NOMA. The grant-free message may be encoded by a LDPC or Polar encoder 1201. For small payloads of PUSCH, in some cases, the Polar coder may have better coding performance than the LDPC. Therefore, in various embodiments, a Polar code is used for small data transmission. For example, a systematic Polar encoder may be used for the PUSCH encoder. The output codeword of the systematic Polar encoder includes the information bits that remain unaltered.

The MA-signature may be configured by the parameter that may be broadcast via RMSI or OSI. For example, the cell-specific MASignatureConfig information element (IE) may be used to configure the MA-signature used by a UE. In some examples, the gNB may semi-statically configure the cell-specific MA signature to the UEs camped on its serving cell, and a UE may use the cell-specific MA signature to generate its grant-free transmissions unless (or until) a new MA-signature is configured by RRC reconfiguration. In an example in which there is no configured cell-specific MASignatureConfig, the UE may assume the grant-free message may be transmitted in an OMA manner. In an example, the UE may assume quadrature phase shift keying (QPSK) is the default modulation scheme unless there is a modulation order defined by a codebook, such as a super position coding scheme. Among the non-orthogonal UEs with configured grant UL transmissions multiplexed to share some or all the resources, each UE may transmit with a cell-specific MA-signature so that the data may be decoded. Disclosed herein is a randomly-selected cell-specific MA-signature from a MA signature pool with a PRACH preamble that indicates the combined signature. In one embodiment, the selected preamble sequence and MA parameters jointly define the combined signature. The cell-specific MA signature may depend on various NOMA schemes, such that the signatures may be spreading-based, codebook-based, or interleaver-based. Spreading-based refers to spreading sequences with or without scrambling sequences, such as the initial state of the scrambler for example. Codebook-based refers to a codebook set and codebook indices. Interleaver-based refers to an interleaver index and/or repetition factor configuration, for example, if specified.

By way of example, suppose that NOMA uses a codebook-based MA-signature for a CFG-PUSCH transmission. In this case, the codebook ID may be used as the MA-signature for the CFG-PUSCH transmission. An example MASignatureConfig message is shown below:

Example MASignatureConfig Message

| -- ASN1START | |
|---|---|
| MASignatureConfig ::= | SEQUENCE { |
| MA-type | |
| MA-Identity | INTEGER (0..maxNrof MA-Signature-ID-1), |
| initScramblingCode | INTEGER |
| ... | |
| } | |
| -- ASN1STOP | |

Referring to FIG. 12 and FIG. 13, the example data flow for transmission of a CFG-PUSCH using NOMA is shown. At 1302, in accordance with the illustrated example of FIG. 13, information bits 1301 are attached with cyclic redundancy code (CRC) bits 1303. Thus, an input 1305 (m in FIG. 12) to the LDPC or Polar encoder 1201 can include length M, which includes the information bits 1301 and the CRC bits 1303. The systematic LDPC or Polar encoder 1201 encode the input 1305 to an output 1307 (c in FIG. 12) having length N, where the code rate may be $$R = \frac{M}{N}.$$

In an example, the channel coder rate may be R=⅙. The LDPC and Polar encoder 1201 can have a systematic encoding scheme. Alternatively, a systematic codeword may be separated into information and parity bits, as the information bits may be included without altering the information bits. The encoded bits c (output 1307 in FIG. 13) with length N may now proceed to the bit-level processing block 1202, in particular to the cell-specific interleaver 1310 that performs cell-specific interleaving $\pi_c$, so as to produce interleaved bits 1309. The interleaved bits 1309 may be fed to the rate matching module 1311. In accordance with the example, the rate matching module 1311 matches the number of bits in a transport block (TB) to the number of bits that may be transmitted for a given allocation. The rate-matching module 1311 may perform functions including adding bit repetition and pruning the interleaved bits 1309, so as to produce rate match bits/block 1313 or r=[$r_1 \ldots r_Q$]. At 1315, the rate-matched bits 1313 can be mapped to QPSK or with superposition coding if specified. The result of the symbol modulation can be denoted as d=[$d_1 \ldots d_L$], where L is the length of modulated symbols. The modulated symbols d may be further processed with spreading codes at 1317 for further enhancement to the transmission signal-to-noise ratio SNR. Without losing the generality, in some cases, a UE may select a cell-specific spreading sequence from a (N, U) sequences S=[$s_1 \ldots s_U$]$\in \mathbb{C}^{N_s \times U}$, where $s_i$ is the spreading sequence and U denotes the maximum number of spreading sequences specified by a cell. The UE spread symbols may be denoted as $z_j=s_i d_l$, where $s_i$ denotes the i-th column in S, and $d_l$ denotes the l-th transmit modulation symbol in d. The spreading sequence may be based on sparse sequences. The spread symbols may then proceed to the RE mapping block 1206.

Figure 14:
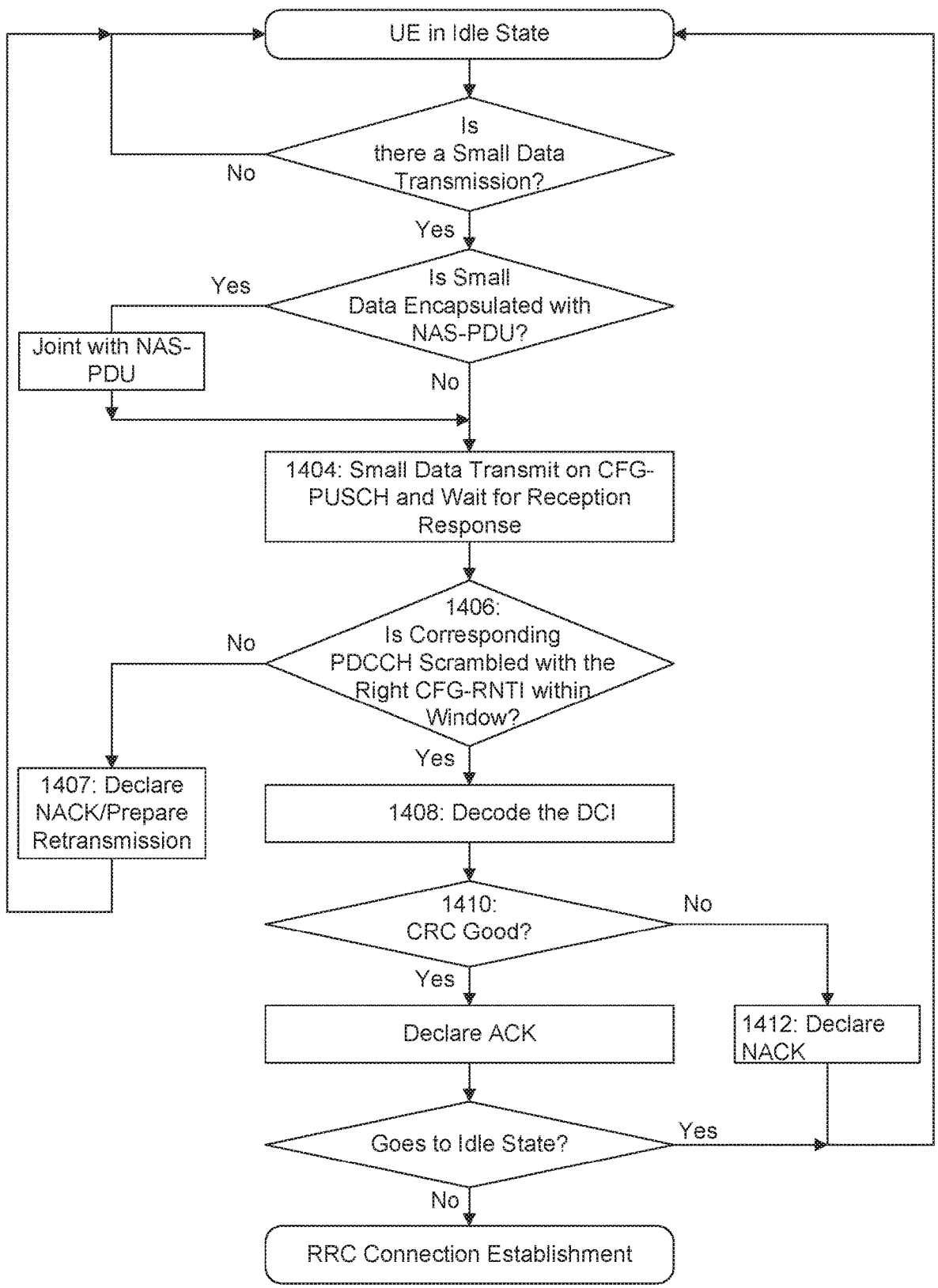
FIG. 14 is a flow diagram for grant-free PUSCH transmissions, which can be referred to as grant-free PUSCH, using NOMA when a user equipment (UE) is in the idle state, in accordance with an example embodiment.

Referring generally to FIG. 14, in some cases, once the small data (CFG-PUSCH) is transmitted (at 1404), the UE may monitor the type1-PDCCH of the PCell for the response(s) identified by the CFG-RNTI defined below. In particular, the response window that starts at the subframe that includes the end of the plus N subframes indicated by the length in the ResponseWindowLength subframes may monitored. The reception response window may be configured by the CFG-ResponseWindow IE broadcast in a RMSI or OSI. In the response to the CFG-PUSCH transmission, at 1406, a UE may attempt to detect a DCI format 1_0 with a CRC scrambled by a corresponding CFG-RNTI during a window controlled by higher layers. In an example, the calculation of CFG-RNTI may be given by:

$$\text{CFG-RNTI}=1+t_{id}+10 \times s_{id}+14 \times 80 \times f_{id}+14 \times 80 \times 8 \times ul_{carrier\_ID}, \quad \text{(Eq. 1)}$$

where $t_{id}$ is the index of the first subframe of the PUSCH ($0 \le t_{id} < 80$), and $f_{id}$ is the index of the CFG-PUSCH within that subframe in ascending order of frequency domain ($0 \le f_{id} < M$). $s_{id}$ is the index of the first OFDM symbol of the PUSCH ($0 \le s_{id} < 14$), and $ul_{carrier\_ID}$:UL is the carrier used for CFG-PUSCH transmission (0=normal carrier, 1=SUL carrier). If the corresponding PDCCH is not scrambled with the correct CFG-RNI within the window, the process may proceed to 1407, where the UE can send a NACK and prepare retransmissions of the small data while in the idle state. If the corresponding PDCCH is scrambled with the correct CFG-RNI within the window, the process may proceed to 1408, where the UE can decode the downlink control information (DCI).

The DCI may indicate the radio resource for the reception response (PDSCH) when a small data packet is encapsulated with a NAS PDU. In accordance with the illustrated example, the resource allocation for the reception response message (a PDSCH) is using resource allocation type 1. In an example, the gNB may respond with a DCI as an (implicit) ACK. In some cases, if the UE does not receive a response that includes a correct CFG-RNTI within a response window, then (at 1407) the UE may assume a NACK and may determine a transmission power for a subsequent retransmission.

The window may start at the first symbol of the earliest control resource set for which the UE is configured. In an example, the search space is a Type1-PDCCH common search space that is at least symbols after the last symbol of the common PUSCH transmission, and μ is the subcarrier spacing configuration for the Type1-PDCCH common search space. The length of the window may be number of slots, which is based on the subcarrier spacing for the Type1-PDCCH common search space that is provided by the higher layer parameter CFG-Response Window.

If a UE detects the DCI format 1_0 with the CRC scrambled by the corresponding CFG-RNTI (at 1410) that includes a DL-SCH transport block within the window (with a DL PDSCH resource allocation), the UE may decode the PDSCH and pass the transport block to higher layers. The higher layers may parse the transport block for a random access preamble (e.g., CFG-PID). In an example, if the higher layers identify both CFG-PID in the reception response message(s) of the DL-SCH transport block, the higher layers indicate an uplink grant to the physical layer. If the UE detects a DCI format 1_0 with the CRC scrambled by the corresponding CFG-RNTI and receives the corresponding PDSCH that includes the DL-SCH transport block, in some cases, the UE may assume the same DMRS antenna port quasi-co-location properties.

If the UE does not detect the DCI format 1_0 with the CRC scrambled by the corresponding NOMA-RNTI within the window, or if the UE does not correctly receive the DL-SCH transport block in the PDSCH within the window, or if the higher layers do not identify the CFG-PID associated with the CFG-PUSCH transmission, then the higher layers may indicate to the physical layer to transmit a CFG-PUSCH at the next transmission cycle (at 1412).

Figure 15:
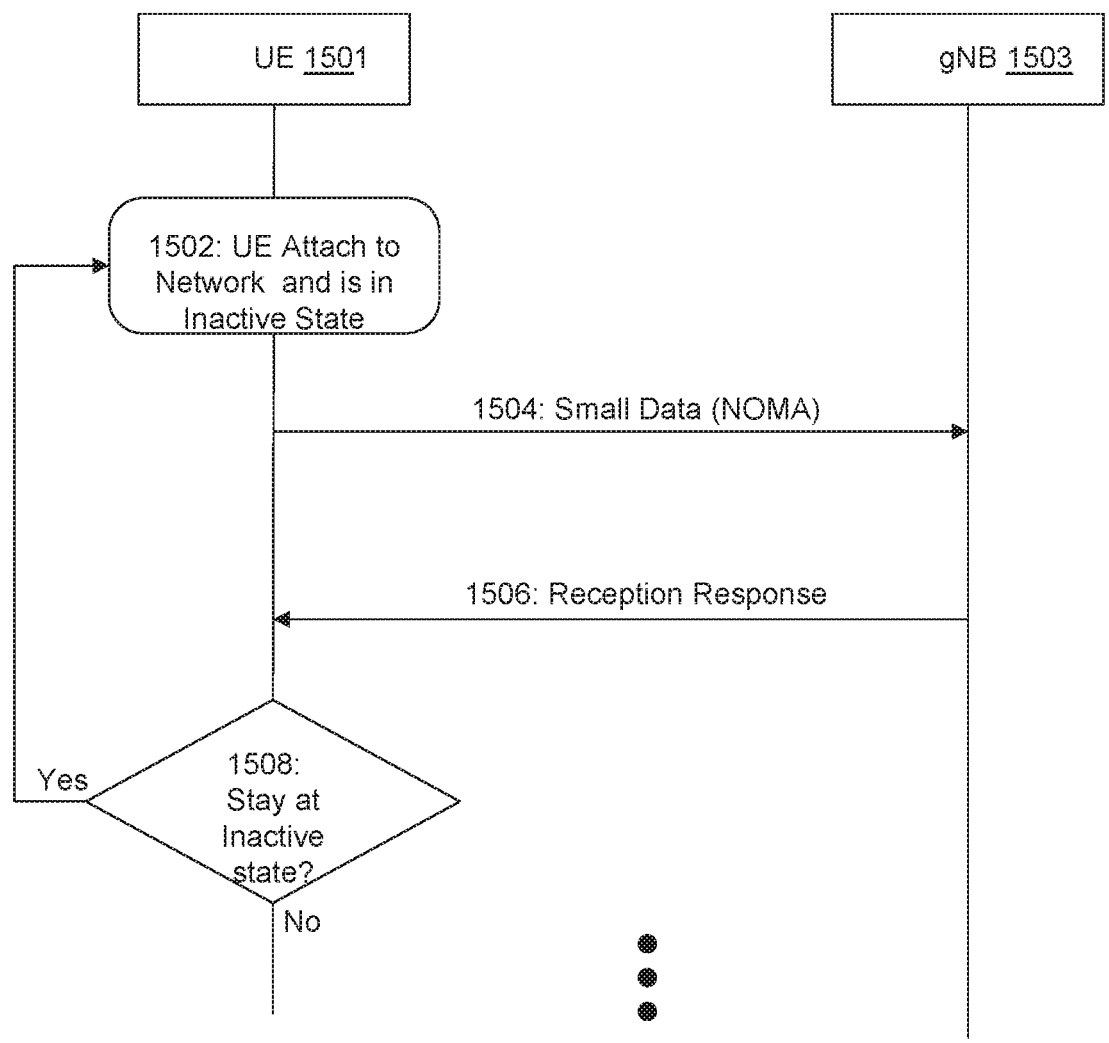
FIG. 15 is an example call flow for small data transmissions when a UE is in the idle state.

Turning now to small data transmission while an example UE 1501 is in the inactive state, with reference to FIG. 15, in order to reduce UL data transmission latency and UE power consumption, a configured grant may be considered for small UL data transmission in the RRC inactive state. In an example, the AS security context is stored between the UE 1501 and an example gNB 1503 so there may be no RRC connection needed in UE inactive mode. At 1502, the UE 1501 attaches to the network and is in the inactive state. The network may determine a configured grant transmission when the UE 1501 is in the inactive state. If there is a configured grant radio resource, the UE 1501 may (at 1504) immediately transmit the small UL data within the configured grant resource in the RRC inactive state. At 1506, the gNB 1503 sends a reception response to the UE 1501. In some cases, the network may allow the UE 1501 to transition to the RRC connected state if there is a large UL data transmission. Thus, at 1508, the UE 1501 may determine whether it should remain in the RRC inactive state or transition to another state.

When a UE transmits small data in the inactive state, the UE ID (I-RNTI), logical channel group (LCG), and buffer status report (BSR) message may combined with the small data packet (e.g., at 1504). Unlike UE in the idle state, the small data indicator (SDI) and last packet indicator (LPI) might not be needed for the small data transmission because the BSR can be sent to the network. In an example, the UE transmits an InactiveStateConfiguredGrantData message in the message part of small the data transmission when the UE is in the inactive state. An example InactiveStateConfiguredGrantData message that can be sent when the UE is in inactive state is illustrated below.

Example InactiveStateConfiguredGrantData Message for RRC Inactive State

```
-- ASN1START
InactiveStateConfiguredGrantData ::= SEQUENCE {
    ue-Identity         I-RNTI,
    requestedCause      ENUMERATED{RRCConnectionResume,... },
    dataUnit            OCTET STRING (SIZE N)
}
-- ASN1STOP
```

In an example, the time and frequency radio resource for configured grant PUSCH may be SP assigned by a parameter given in InactiveStateConfiguredGrantConfig parameters. InactiveStateConfiguredGrantConfig may include the following parameters in Table 5, presented by way of example and without limitation.

TABLE 5

Example information elements in InactiveStateConfiguredGrantConfig

| Example Information Element | Example Usage |
| --- | --- |
| timeDomainAllocation | Indicating the $1^{st}$ symbol at a time slot for CFG-PUSCH transmission and the length |
| frequencyDomainAllocation | Indicate PRB location within the (initial or default) BWP. |
| Number of PRBs and numerology | Number of allocated PRB and subcarrier spacing |
| Transmission periodicity | 1 ms, 2 ms, 4 ms, etc. |
| DMRS configuration | Uplink DMRS port configuration parameter |
| NOMA parameter | MA-signature parameter |

The example parameter timeDomainAllocation in InactiveStateConfiguredGrantConfig may indicate a combination of start symbol and the length for CFG-PUSCH. Frequency domain resource allocation for this configured grant PUSCH may be determined by the higher layer parameter frequencyDomainAllocation, which indicates PRB location within the initial BWP or a default BWP. Because the UE does not release the RRC context, the UE may be configured at the initial BWP or default BWP. In some cases, transmission periodicity indicates the next available transmission opportunity. A given gNB may configure multiple configured grant (or grant-free) resources for configured-grant PUSCH transmissions. Different configured granted may be configured with different transmission period. Further, in some cases, the guard band or extended CP are not required for the UE to transmit small data in the inactive state because, for example, the UE may be in UL and DL synchronization while the Timing advance Timer (e.g., TimeAlignmentTimer) is not expired. If the UE has not received a Timing Advance Command (TAC) until the expiration of TimeAlignmentTimer, the UE may assume that it has lost the uplink synchronization. Thus, prior to any CFG-PUSCH transmission when UE is in the inactive state, an explicit timing-re-alignment phase using the RA procedure may be performed to restore the uplink time alignment.

Figure 16:
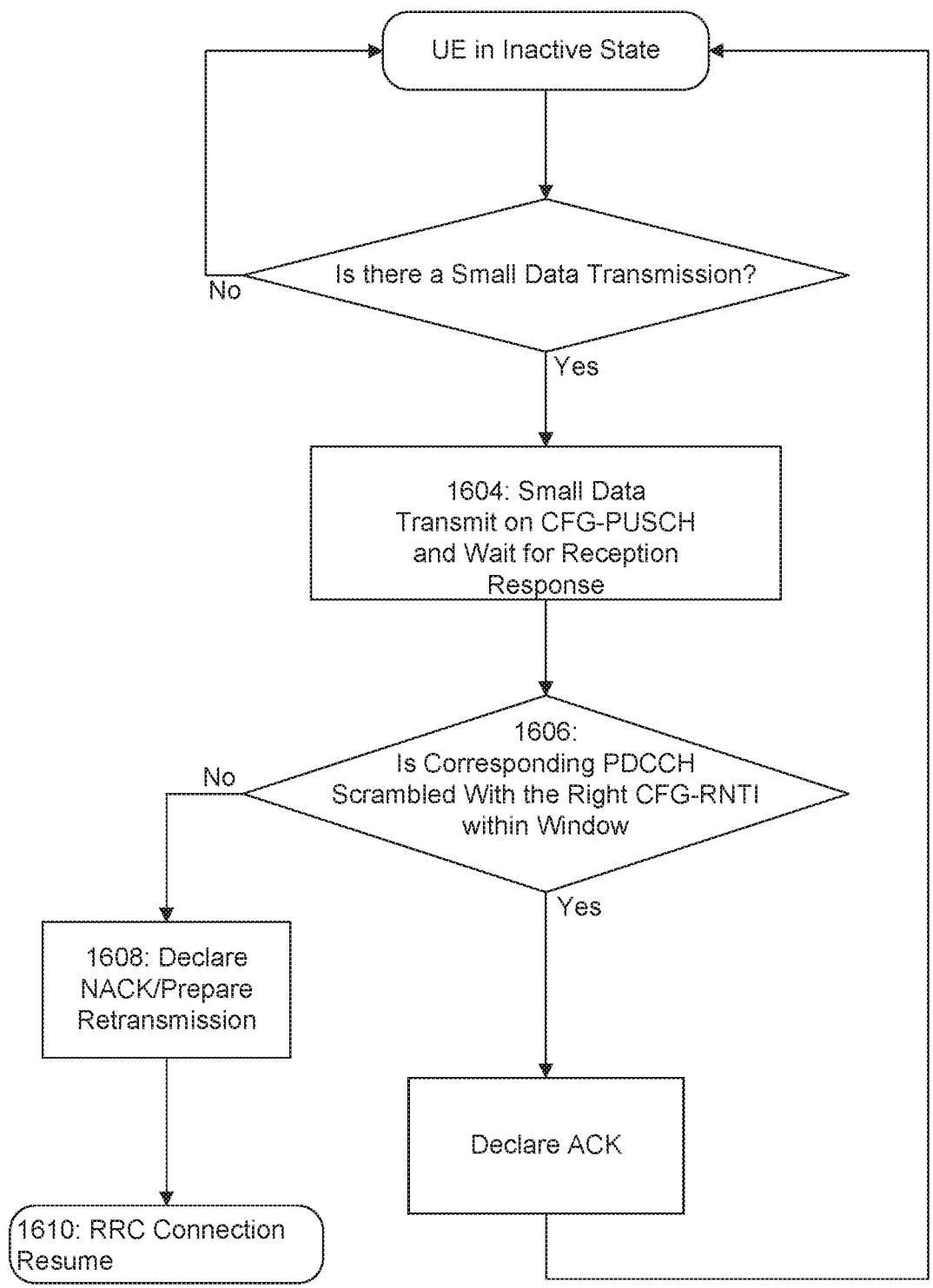
FIG. 16 is an example flow diagram for a UE performing small data transmissions in the inactive state, in accordance with an example embodiment.

Unlike an example UE in the idle state, in some examples the UE-specific DMRS port and MA-signature may be allocated when the UE is in the inactive state, thereby avoiding collisions. Referring to FIG. 16, similar to a given UE in the idle state, once the small data (CFG-PUSCH) is transmitted (at 1604), the UE may monitor the type1-PDCCH of the PCell for the response(s) identified by the CFG-RNTI defined in Eq. 1 above. However, when there is a NACK (at 1608) after the determination at 1606, the UE may be notified by the gNB to switch to RRC connected state for retransmission (at 1610).

Figure 17:
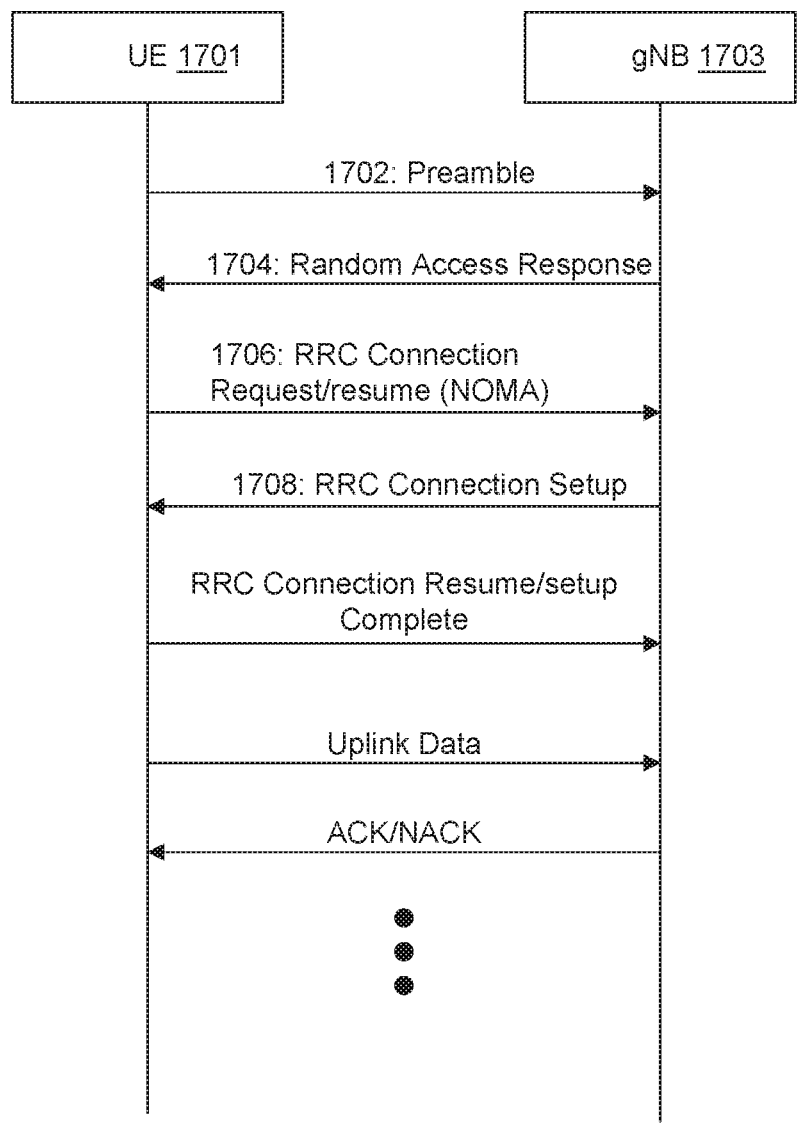
FIG. 17 is a call flow of an example Random Access Procedure with PUSCH using NOMA transmissions.

Referring now to FIG. 17, when an example UE 1701 is in the RRC idle state, the UE 1701 may use contention-based Random Access (RA) for the RRC connection request or connection resume. It is recognized herein, however, that an excessive number of UEs participating in a random access procedure may lead to severe congestion in the PRACH. If more than one UE chooses the same preamble in a PRACH, for example, then a gNB 1703 may schedule the same resource blocks (RBs) in the uplink data channel for these UEs. This situation may result in a collision in the uplink data transmission because the gNB 1703 might not decode the data transmission from more than one UEs via the same RBs. Thus, continuing with the example, the RA contention will not be resolved until the UE successfully decodes the message at 1708 in the 4-step RA procedure. Thus, it is recognized herein that the latency of the 4-step RA procedure may be an issue when there is a PRACH preamble collision at the first step (step 1702) of the RA. It is further recognized herein that collisions may occur at moderate and high loads, especially in scenarios involving event-triggered reports.

As shown in FIG. 17, in accordance with an example embodiment, a technical solution is to use NOMA at 1706 for the PUSCH transmission. In doing so, the TA information is available for the PUSCH transmission at 1706. Because the TA information is available for PUSCH at 1706, the PUSCH transmission at 1706 may be based on synchronous transmission. Thus, if more than one UE chooses the same preamble in a PRACH at 1702, the gNB 1703 may schedule the same resource blocks (RBs) in the uplink data channel for the PUSCH for those UEs. If NOMA is applied at 1706 for PUSCH, the UE 1701 may choose a different MA signature from cell-specific MA signature pools. Thus, the collision probability due to choosing the same RACH preamble at 1702 can be reduced, the latency can be reduced, and the detection probability can be enhanced.

Still referring to FIG. 17, at 1706, the UE 1701 may determine whether it may apply transform precoding for PUSCH at 1706, based on an RRC parameter that can be referred to as msg3-tp (msg3-Transform Precoding). The UE 1701 may determine the subcarrier spacing for the PUSCH from the RRC parameter called msg3-scs (Subcarrier Spacing). The UE may transmit the PUSCH at 1706 on the same serving cell to which it sends the PRACH. In contrast to the configured grant example, in some cases, the PUSCH using NOMA does not have a ConfiguredGrantConfig setup because the MA signature and DMRS port for the PUSCH message may be provided by the random access response (RAR) at 1704. Therefore, the signaling for performing NOMA can include MASignatureConfig. The MASignatureConfig message may be broadcasted vis RMSI or OSI, or be included in the message at 1704. NOMA may be enabled via DCI signaling of the RAR. If NOMA is enabling in the RAR, then the PUSCH at 1706 may use NOMA for its transmission scheme. A cell-specific MA signature pool may be assigned, and the UE 1701 may randomly select a cell-specific MA signature from, or based, on its IMSI, so as to choose a cell-specific MA signature from the MA signature pool for PUSCH at 1706. Example data flows of the PUSCH at 1706 using NOMA is described herein.

In some cases, a given UE may use Discontinuous Reception (DRX) in RRC-IDLE and RRC-INACTIVE states to reduce power consumption. The UE may monitor one paging occasion (PO) per DRX cycle. A PO is a set of PDCCH monitoring occasions and may consist of multiple time slots (e.g., subframe or OFDM symbol) within which a paging DCI may be sent. In an example, one paging frame (PF) may be one radio frame and may include one or multiple PO(s), or the starting point of a PO. UEs in the RRC-IDLE mode may monitor the PDCCH channel for P-RNTI used for paging to receive paging message from a given gNB. At other times, in some examples, a given UE may go to sleep or enter a power saving mode to save battery power. In multi-beam operations, by way of example, the length of one PO may be one period of beam sweeping and the UE may assume that the same paging message is repeated in each of the beams of that sweeping pattern. The length of default DRX Cycle may be signaled in SystemInformationBlock1. In RRC-IDLE mode, in some examples, the AMF may fully manage the UE mobility and the paging procedure.

In RRC_IDLE state, the Discontinuous Reception (DRX) may be used by the UE to reduce the power consumption. The UE may monitor one paging occasion (PO) per DRX cycle, where a PO is a set of PDCCH monitoring occasions where paging DCI may be sent. For uplink transmissions with configured grant type 2, the configured grant may be configured by both RRC and activation DCI. In the RRC-IDLE state, in accordance with an example embodiment, a UE may monitor and detect the activation DCI for configured grant type 2. For example, the paging DCI, which may be scrambled with P-RNTI, may indicate the short message to a UE; indicating the paging PDSCH to a UE; and/or indicate the activation/deactivation DCI to a UE. A UE may determine that the paging DCI serves as the activation/deactivation DCI indicating the configured grant for uplink transmission in the RRC-IDLE state. In addition, the various NOMA configuration parameters such as preamble format (or preamble index), DMRS port, and UE-specific MA signatures, may be assigned to UE.

Figure 18:
FIG. 18 is another example functional flow diagram of an example NOMA transmission scheme.

Disclosed herein is an example NOMA transmission scheme that is robust with ICI to support asynchronous transmission. This disclosed NOMA transmission scheme may be modified from orthogonal frequency division multiplexing with index modulation (OFDM-IM) disclosed by IEEE (See E. Başar, Ü. Aygölü, E. Panayirci and H. V. Poor, "Orthogonal frequency division multiplexing with index modulation," 2012 *IEEE Global Communications Conference (GLOBECOM)*, Anaheim, Calif., 2012, pp. 4741-4746). FIG. 18 illustrates the example NOMA transmission scheme.

Referring to FIG. 18, the information bits attached with CRC to have m (with length M bits) may be input to a systematic LDPC or Polar encoder 1801, thus the output of encoder 1801 can have encoded bits c of length N, where the code rate is $$R = \frac{M}{N}.$$

For example, the channel coder rate may be R=⅙. The encoded bits c with length N may then proceed to a bit-interleaver 1802 ($\pi$). The interleaved bits may be fed to a rate matching and modulation function 1804. The rate matching function 1804 may match the number of bits in a transport block (TB) to the number of bits that may be transmitted for a given time-frequency resource allocation. The rate-matching function 1804 may involve bit repetition or pruning the interleaved bits. Then, the rate-matched bits/block $r=[r_1 \ldots r_Q]$ may be mapped to M-QAM or with superposition coding if specified. As shown, $z=[z_1 \ldots z_L]$ is denoted as the result of symbol modulation, where L is the length of modulated symbols.

Figure 19:
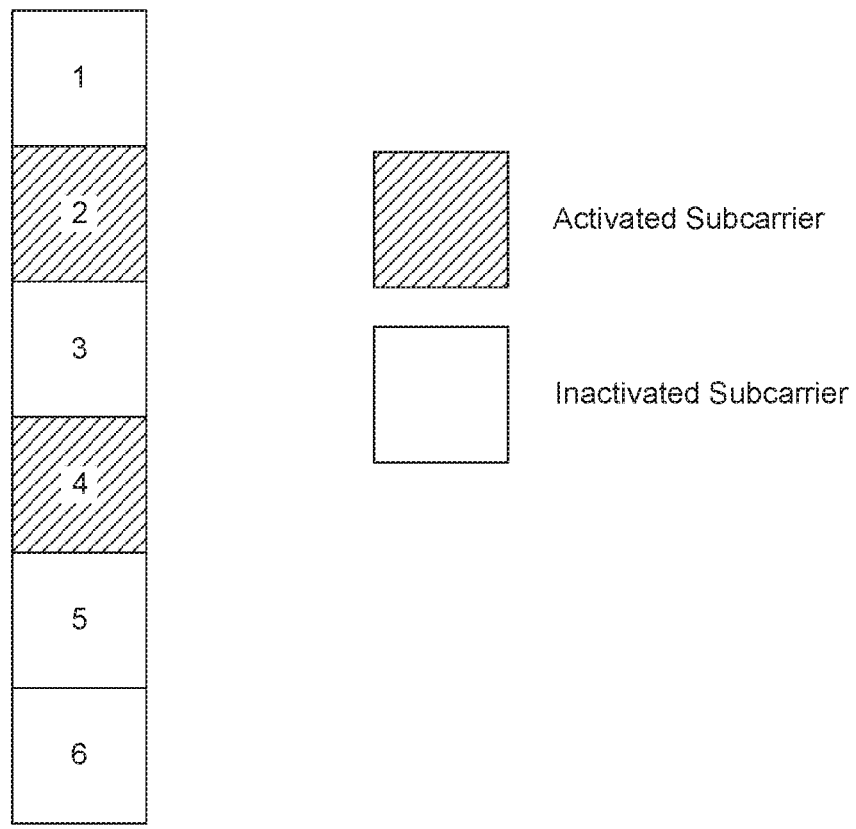
FIG. 19 depicts an example subcarrier activation pattern for S={1, 2, 3, 4, 5, 6} and k=2.

The modulated symbol $z=[z_1 \ldots z_L]$ may be fed into a RE-mapping function 1806. The RE-mapping may be based on sparse subcarrier allocation. Similar to OFDM-IM (See *IEEE GLOBECOM* disclosed herein), the number of activated subcarriers are sparse in a defined set of subcarriers. By way of example, 6 contiguous subcarriers may be defined as a set of subcarriers S={1, 2, 3, 4, 5, 6} and only k=2 subcarriers may be activated in S. Here, consider k<<|S| where |•| denotes the number of elements in a set. In this example, it has C(|S|=6, k=2)=15 combinations to indicate which two subcarriers are activated, i.e., {1, 2}, {1, 3}, {1, 4}, {1, 5}, {1, 6}, . . . {5, 6} in S. Therefore, a subcarrier activation pattern (SAP) can be defined for set of subcarriers. In this example, the SAP is equivalent to {1, 2}, {1, 3}, {1, 4}, {1, 5}, {1, 6}, . . . {5, 6} for S. In FIG. 19, the example activation pattern {2, 4} in S={1, 2, 3, 4, 5, 6} is shown.

The SAP may be used for sparse RE mapping or it may be called as a codebook with each column being k-sparse. The SAP for S={1, 2, 3, 4, 5, 6} and k=2 may be expressed in to a matrix form, as shown in the below example:

$$A = \begin{bmatrix} 1 & 1 & 1 & \ldots & 0 & 0 \\ 1 & 0 & 0 & \ldots & 0 & 0 \\ 0 & 1 & 0 & \ldots & 0 & 0 \\ 0 & 0 & 1 & \ldots & 1 & 0 \\ 0 & 0 & 0 & \ldots & 0 & 1 \\ 0 & 0 & 0 & \ldots & 1 & 1 \end{bmatrix}$$

Here, each k-sparse column may be defined as a MA-signature. For S={1, 2, 3, 4, 5, 6} and k=2, maximum number of MA-signature is equal to 15 (or the overloading factor is equal to 15/6=2.5). The data symbol to RE mapping may be performed in various ways that are now described.

$$i = 1, \ldots \left\lfloor \frac{L}{k} \right\rfloor$$

In one example, k symbols $\{z_i, z_{i+1}, z_{i+k}\}$ and from data symbol $z=[z_1 \ldots z_L]$ are grouped and mapped to a k-sparse column (MA signature). For example, S={1, 2, 3, 4, 5, 6} with k=2, and a k-sparse e.g.

$$\begin{bmatrix} 0 \\ 0 \\ 1 \\ 0 \\ 1 \\ 0 \end{bmatrix}$$

is chosen as the MA-signature. In this example, the two symbols may be mapped to subcarrier 3 and 5, thus the RE mapping results with data symbols expressed as:

$$\begin{bmatrix} 0 \\ 0 \\ z_1 \\ 0 \\ z_2 \\ 0 \end{bmatrix} \ldots \begin{bmatrix} 0 \\ 0 \\ z_{L-1} \\ 0 \\ z_L \\ 0 \end{bmatrix}$$

In another example, each symbol $z_i$ is spread into a k-sparse column (MA signature). In this example, each symbol is spread k times, thus the spreading gain is equal to k. For example, S={1, 2, 3, 4, 5, 6} with k=2, and we a k-sparse e.g.

$$\begin{bmatrix} 0 \\ 0 \\ 1 \\ 0 \\ 1 \\ 0 \end{bmatrix}$$

is chosen as the MA-signature. In this example, the two symbols may be mapped to activated subcarrier 3 and 5. Thus, we have the RE mapping with data symbols expressed as:

$$\begin{bmatrix} 0 \\ 0 \\ z_1 \\ 0 \\ z_1 \\ 0 \end{bmatrix} \ldots \begin{bmatrix} 0 \\ 0 \\ z_L \\ 0 \\ z_L \\ 0 \end{bmatrix}$$

In some cases, not all of k-sparse column (MA signature) defined in matrix A are used for the NOMA transmission. For example, some of k-sparse columns (MA-signatures) may be disabled for optimal tone spacing between adjacent subcarriers to mitigate ISI and ICI due to asynchronous transmission.

To be robust with ICI and ISI due to asynchronous transmission, guard bands may be reserved at the edge subcarriers. For example, if 4 RB (48 subcarriers) are allocated for asynchronous transmission, the top M subcarriers and the bottom of M subcarriers may be reserved and filled with zero transmission. In this example, subcarriers (starting from 1) from 7 to 42 subcarriers are allowed for NOMA transmission if M=6.

Thus, as described above, an apparatus, for instance a network apparatus such as a gNB, can include a memory and a processor that can execute computer-executable instructions stored in the memory to cause the apparatus to configure contention-based radio resources for a physical uplink shared channel (PUSCH) so as to define a configured grant PUSCH. The apparatus can broadcast information to a user equipment (UE) so as to configure the configured grant PUSCH for the UE. Thereafter, the apparatus can receive small data transmitted from the UE via the configured grant PUSCH. Thus, a given UE can receive broadcast information that indicates contention-based radio resources for a physical uplink shared channel (PUSCH) so as to define a configured grant PUSCH. Based on the broadcast information, the UE can transmit small data via the configured grant PUSCH while remaining in an RRC-IDLE state or an RRC-INACTIVE state. The broadcast information can be broadcast in a remaining system information block.

The broadcast information can include one or more non-orthogonal multiple access parameters (e.g., an indication associated with a demodulation reference signal port, a multiple access signature, and/or an interleaver), such that the configured grant PUSCH is configured with the one or more non-orthogonal multiple access parameters. As described herein, the small data can be transmitted from the UE while the UE is in an RRC-IDLE state or an RRC-INACTIVE state. The UE can transmit, and thus the network apparatus can receive, a demodulation reference signal at a front of the configured grant PUCSH, wherein the front can be defined with respect to time. The UE can also transmit, and thus the network apparatus can also receive, a random access preamble that is multiplexed with the configured grant PUSCH. When no timing advance information is available, for example, the UE can transmit the small data in an asynchronous mode while remaining in the RRC-IDLE state.

Figure 20:
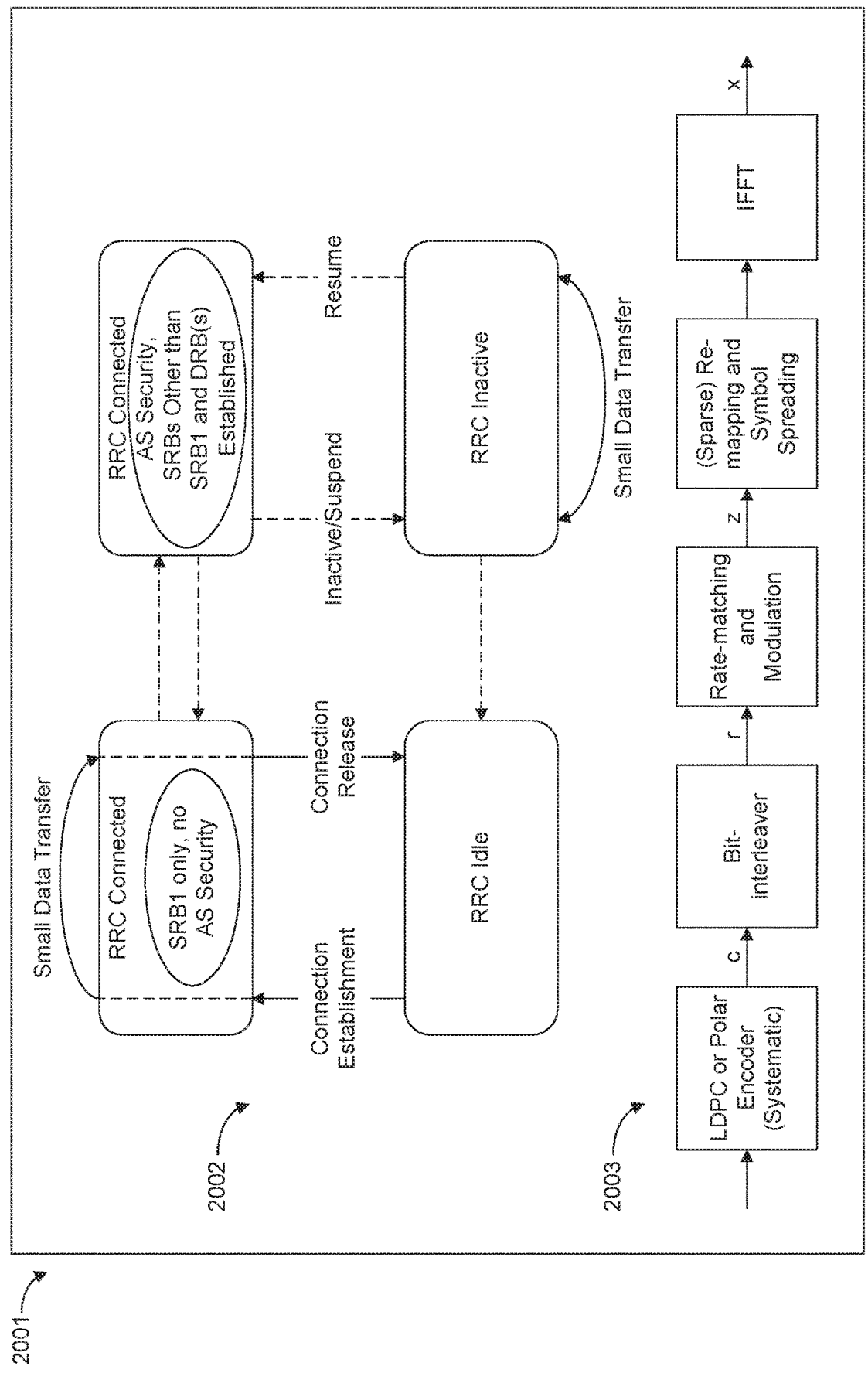
FIG. 20 illustrates an example display (e.g., graphical user interface) that may be generated based on the methods, systems, and devices of small data transmission using NOMA.

Referring now to FIG. 20, an example display (e.g., graphical user interface) is shown. The graphical user interface (GUI) may be generated based on the methods, systems, and devices of small data transmission using NOMA as discussed herein. Display interface 2001 (e.g., touch screen display) may provide text in block 2002 associated with small data transmission using NOMA, such as method flow and state transitions. Progress of any of the steps (e.g., sent messages or success of steps) discussed herein may be displayed in block 2002. In addition, graphical output 2002 may be displayed on display interface 2001. Graphical output 2003 may be the topology of the devices implementing the methods, systems, and devices of small data transmission using NOMA, a graphical output of the progress of any method or systems discussed herein, or the like.

Referring now to FIGS. 23A and 23B, by way of another example, it may be assumed that the information bits that need to be transmitted are denote as $m_b=[m_1 \ldots m_{N_b}]$, where $N_b$ is the length of information bits and $m_i \in \{0, 1\}$ for $i=1 \ldots N_b$. The reference bits may need to be inserted with information bits denoted as $m_p=[m_1 \ldots m_{N_p}]$, where $N_p$ is the length of reference bits and $m_i \in \{0, 1\}$ for $i=1 \ldots N_p$. The reference bits can be constructed via a low-correlation binary sequence, such as a (Binary) Maximal-length sequences (M-sequence) and initialized with a UE-specific ID; a (Binary) Gold-sequence and initialized with a UE-specific ID; or a Low-correlation sparse sequence (a vector) and can be initialized with a UE-specific ID.

Figure 22:
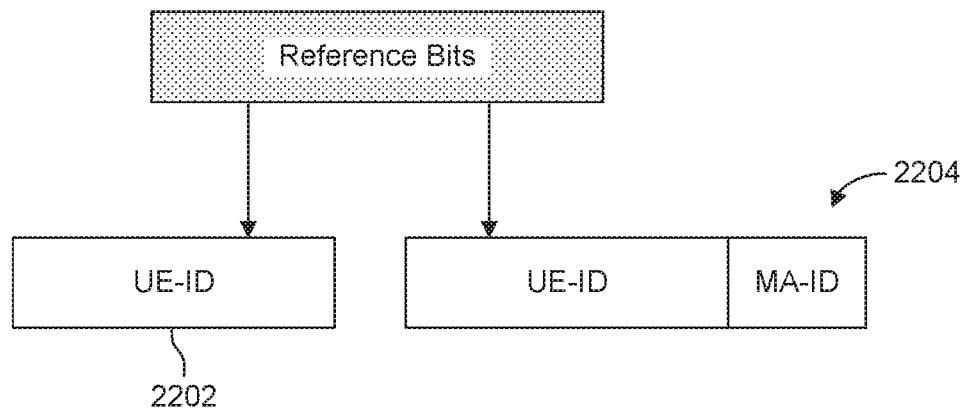
FIG. 22 depicts an example construction of reference bits for a user equipment identity (UE-ID) only and for a UE-ID with a multiple access (MA) identity (MA-ID).

For example, when the reference bits/block is constructed by using M-sequence, the M-sequence h(n) can be specified as follows. The output of LFSR may be periodic with max period $L=2^{n=6}-1=31$ (or sequence length) and the generator polynomial defined $x^6+x+1$, where the operator+is modulo-2 addition. For example, when the reference bits/block is constructed by a gold sequence, the gold sequence g(n) can be specified as follows:

$g(n)=(x_1(n+N_c)+x_2(n+N_c)) \bmod 2$ $x_1(n+31)=(x_1(n+3)+x_1(n)) \bmod 2$ $x_2(n+31)=(x_2(n+3)+x_2(n+2)+x_2(n+1)+x_2(n)) \bmod 2$ where $N_c$ is a constant (e.g. =1600) and the operator "+" is modulo-2 addition. The $x_1$ and $x_2$ are polynomial generator with length 31. The sequence initialization for gold sequence is given by $c_{init}=(2^{17}(14n_s+l+1)(2N_{ID}^{nSCID}+1)+2N_{ID}^{nSCID}+n_{ID})$
$\bmod 2^{31}$, where $N_{ID}^{nSCID}$ denotes the UE-specific ID, $n_{ID}$ denotes MA signature ID, $n_s$ is the slot number and l is the OFDM symbol number in a slot. For grant-free with K-repetition, the $n_s$ may be based on the $1^{st}$ transmission's slot number and symbol number to maintain the same data transmission with K-repetition. The $N_{ID}^{nSCID}$ can be function of UE-ID, $n_{ID}$ for MA signature, and/or MCS (if necessary). Referring to the initialization of sequence (e.g., initialization parameters $c_{init}$), with reference to FIG. 22, a UE specific ID 2202 can be designed as a random pattern. This random pattern can be initialized based on UE-ID, where UE-ID can be pre-configured with high layer (e.g., RRC) signaling. In this case, the explicit UE-specific ID 2202 and MA-signature ID 2204 can be jointly used for the preamble generation, as further described herein.

Figure 24B:
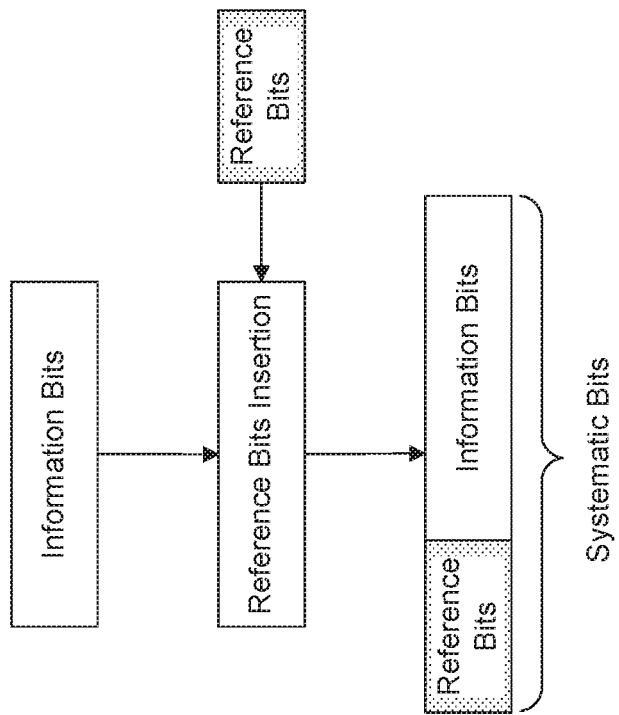
FIG. 24B depicts an example systematic bit construction in which information bits are appended after reference bits.
Figure 24A:
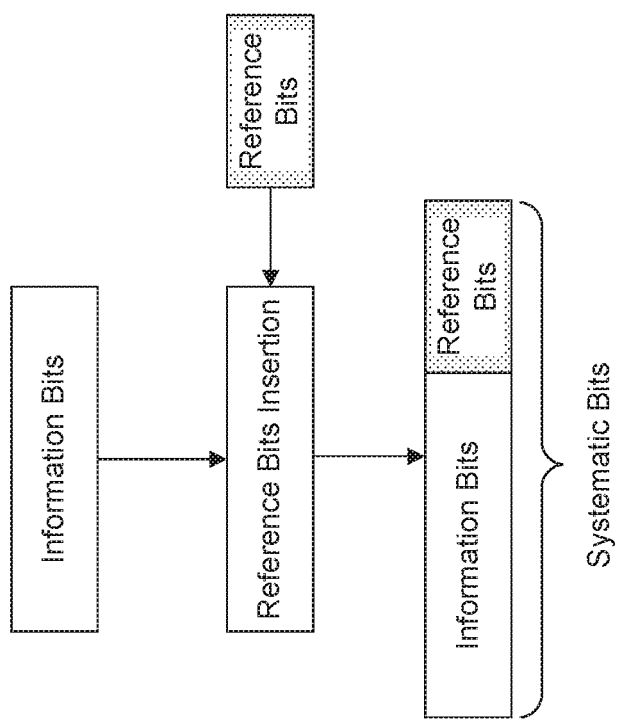
FIG. 24A depicts an example systematic bit construction in which reference bits are appended after information bits.

With respect to systematic bits/block, the information bits $m_b$ and reference bits $m_p$ can be synthesized for the systematic bits m. The synthesized systematic bits m for the input of LDPC encoder can be constructed by insertion of the reference bits $m_p$ with the information bits $m_b$. There are two example insertion options illustrated: the first synthesized option (FIG. 24A) is the reference bits $m_p$ appended/inserted right after the information bits $m_b$, i.e., $m=[m_b; m_p]$. The second synthesized example (FIG. 24B) includes the information bits appended after the reference bits, i.e., $m=[m_p; m_b]$. Example synthesized methods for systematic bits are illustrated in FIGS. 24A and 24B. Then the systematic bits m are encoded into c of length N by a systematic LDPC encoder, where the code rate is $$R = \frac{N_b + N_p}{N}.$$

Figure 25:
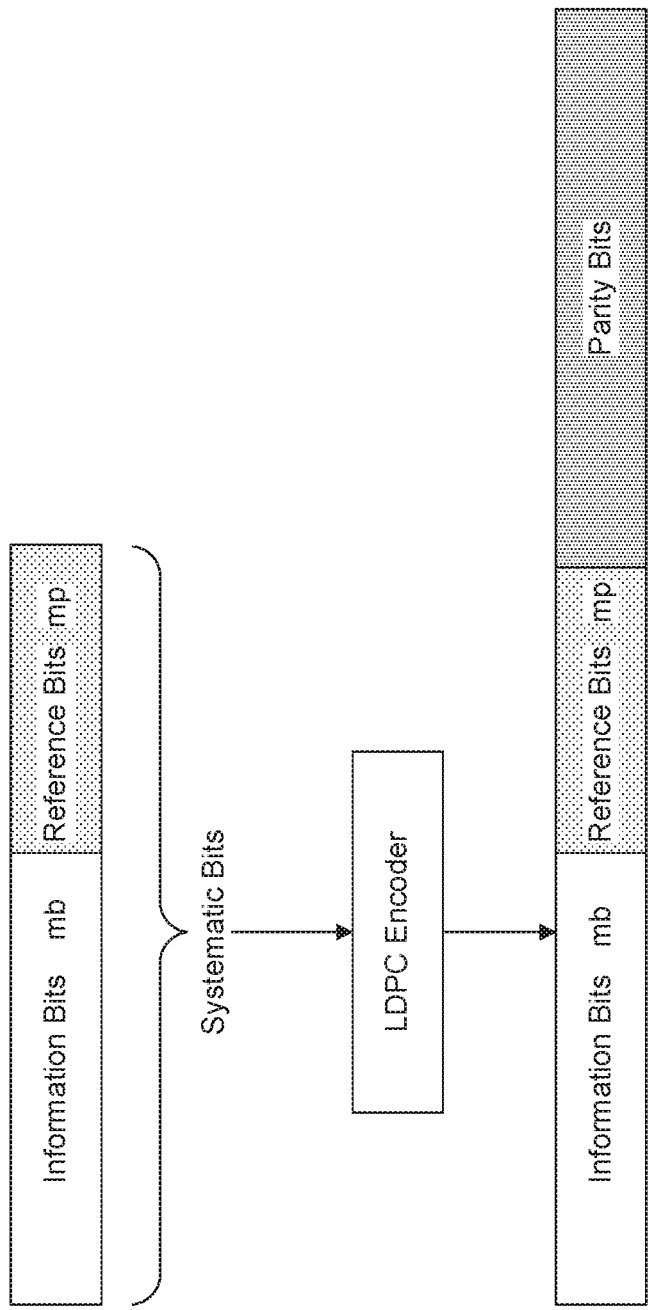
FIG. 25 depicts an example of encoded bits constructed by a systematic low-density parity coder (LDPC).

Referring now to FIG. 25, in some cases, for any systematic LDPC, encoded bits c consist of the original data (i.e., information $m_b$ and reference bits $m_p$) and the corresponding parity data bits $p=[p_1 \ldots p_{N-(N_b+N_p)}]$. The resulting encoded bits c may thus be divided into two parts as follows: 1) the known part (reference bits) and 2) the unknown part (information and parity bits). Example encoded bits c constructed by a systematic LDPC encoder is illustrated in FIG. 25.

Turning again to bit-level processing, the LDPC-encoded bits/block c of length N is now proceeded to the bit-level processing. First, the LDPC-encoded bits/block c may be permutated into two sub-blocks, i.e., the preamble block, i.e., $m_p$ and the information and parity bits sub-block, i.e., $[m_b; p]$. The preamble sub-block $m_p$ may be used for the generation of preamble and may be rate-matched for generation of the rate-matched bits/block $r=[r_1 \ldots r_Q]$, where Q is the rate-matching output length. The basic function of the rate matching module is to match the number of bits in transport block (TB) to the number of bits that can be transmitted in the given allocation. The rate-matching function involves bit repetition and pruning for the interleaved bits.

Figure 26:
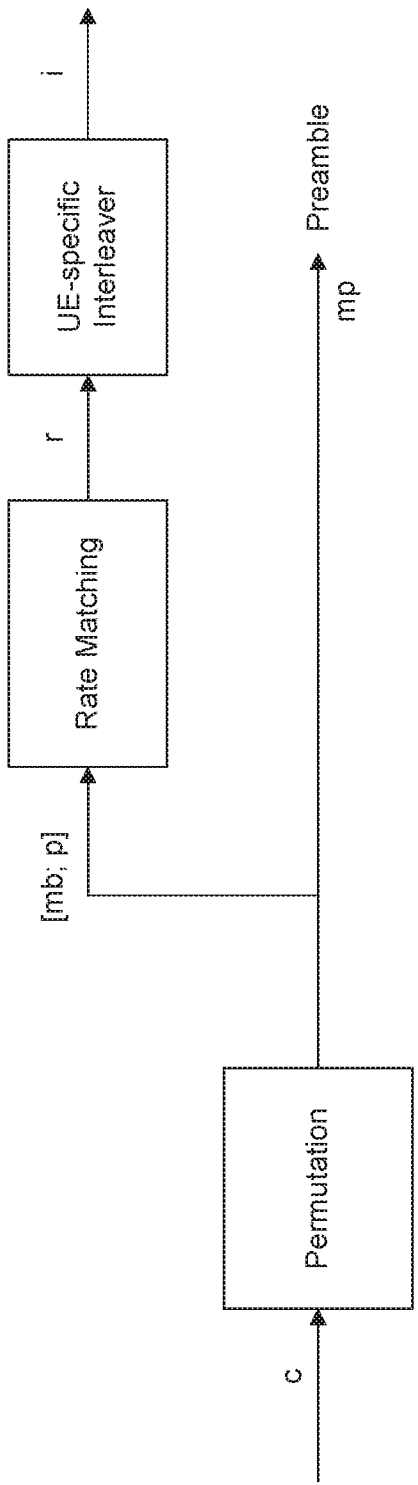
FIG. 26 depicts bit-level processing in accordance with an example embodiment.

The rate-matched bits/block $r=[r_1 \ldots r_Q]$ may follow a UE-specific bit-level interleaver $\pi_u$, where $\pi_u$ denotes u-th UE specific interleaver. In an example, the interleaved output for the input rate-matched bits/block $r=[r_1 \ldots r_Q]$ is denoted by $i=[i_1 \ldots i_{N-N_p}]$. The UE-specific interleaver $\pi_u$ can help the inter-user interference suppression. Example functional blocks of bit-level processing are shown in FIG. 26.

Turning now to symbol-level processing, in the symbol modulator, the interleaved bits/block $i=[i_1 \ldots i_{N-N_p}]$, which contains information and parity bits, may be mapped to QPSK, 16QAM, 64QAM, or with superposition coding. The modulation scheme can be configured by higher layer (RRC) signaling for each UE, and different UE may be assigned with different modulation methods, for example, because different UE may have different transmission power constraints. It is denoted that $d=[d_1 \ldots d_L]$ as the interleaved bits/block i after symbol modulation, where L is the modulated symbols length. The modulated symbols d can be further processed with spreading codes/sequences for further enhanced transmission SNR. In an example, the symbol spreading function can be configured (i.e., enable/disable) by higher layer signal (e.g., RRC). For example, if RRC configuration is set to disable, then no symbol spreading is performed. If symbol spreading is enabled, it may be assumed, in some examples, that the maximum number of spreading codes/sequences is equal to U. An ($N_s$, U) sequence S is a set of U unit-norm complex or real vectors in $\mathbb{C}^N$ or $\mathbb{R}^N$ and $N_s$ is the spreading sequence length. Without losing the generality, the u-th UE can be assigned with a unique spreading sequence form (N, U) sequence S=[$s_1 \ldots s_U$]$\in \mathbb{C}^{N_s \times U}$, where $s_i$ is the spreading sequence for i-th UE. The i-th UE spread symbols can be denoted as $z_l = s_i d_l$, where $s_i$ denotes the i-th column in S, $d_l$ denotes the l-th transmit modulation symbol in d.

In an example, the reference bits/block $m_p$ can be used as a preamble or DM-RS after performing symbol modulation of reference bits or mapping reference bits into preamble sequence or DM-RS. Hence, the receiver can perform channel estimation based on the preamble, the DM-RS, or jointly with data. In an example, because reference bits/block are jointly encoded with the information bits, once a UE-specific preamble/DM-RS is detected by the receiver (e.g., by performing the correlation with all sequences/preambles/DM-RS), the receiver can use this information for further enhancing the decoding performance. Therefore, it is recognized herein that the described herein embodiments may produce advantages over NOMA schemes that are codebook based, sequence based, or interleaver-based, because the UE-activity detection information can help decoding performance.

If the reference bits/block $m_p$ is straightly formed by a m-sequence, gold-sequence or sparse binary sequence, in an example, then the generation of preamble/DM-RS $s_p$ (vector) can be modulated with either QAM (e.g. QPSK) or superposition coding as $$s_p(m) = \frac{1}{\sqrt{2}}(1 - 2m_p(2m)) + j\frac{1}{\sqrt{2}}(1 - 2m_p(2m+1)),$$

where $s_p(m)$ denotes the m-th element in $s_p$. If the preamble bits/block (i.e., reference bits/block $m_p$) is taken from an explicit data bits/block (e.g., UE-specific ID) then the preamble bits $m_p$ may be remapped into a preconfigured sequence. The remapping can be configured by higher layer (RRC) signaling, thus it can have the one-to-one mapping between the value of reference bits and preamble sequence. The remapping function can be dependent on an orthogonal or a low-correlation sequence. A mapping function example for converting four explicit reference bits to a ZC sequence with $N_C=17$ length is listed in Table 6 below. In Table 1, different values of reference bits map to a ZC sequence with different roots.

TABLE 6

Example Reference bits/block to a preamble sequence

| Preamble Value (reference bits) | ZC Sequence Sequence length $N_C$ = 17 (prime number) |
|---|---|
| 0001 | $e^{j\pi \frac{k(k+1)}{N_c}}$ |
| 0010 | $e^{j2\pi \frac{k(k+1)}{N_c}}$ |
| . | . |
| . | . |
| . | . |
| 1111 | $e^{j15\pi \frac{k(k+1)}{N_c}}$ |

Figure 27:
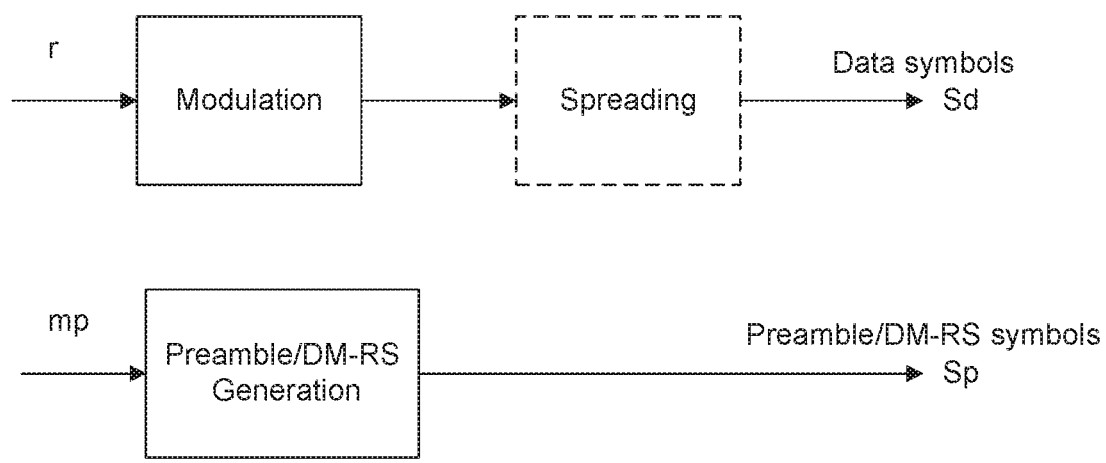
FIG. 27 depicts symbol-level processing in accordance with an example embodiment.

Example functional blocks of symbol-level processing are shown in FIG. 27.

Once the reference bits are converted into a preamble or DM-RS, the preamble or DM-RS may be mapped into resource elements for DFT-s-OFDM or CP-OFDM. The RE mapping, time-frequency resource mapping rule and waveform (CP-OFDM, DFT-s-OFDM) can be pre-configured via higher layer RRC signaling. Example RE mapping rules for preamble or DM-RS transmission are described below.

The preamble or DM-RS that is constructed from the reference bits can be front loaded, i.e., it can be transmitted first and then followed by data. Data does not need to be allocated right after with the preamble or DM-RS. In some cases, this is because some of the OFDM symbols may be reserved for other purposes, such as reserved mini-slots, etc. In this case, the transmission gap between the preamble/DM-RS and data can be pre-configured via higher layer RRC signaling or DL SFI. If there is no transmission gap configured, then data can be transmitted after the preamble or DM-RS. In an example, the transmission gap resolution (unit) is based on (OFDM) symbols. When the reference bits are used as DM-RS, it can be transmitted at the DM-RS ports indicated by higher layer signaling. In addition, in some examples, high layer signaling can also indicate extra DM-RS (ports) for further enhancing the channel estimation, in addition to the preamble or DM-RS generated from reference bits. If the higher layer indicates that the reference bits in the NOMA transmission are disabled, i.e., $m_p$ is a NULL vector, then the extra DM-RS (ports) can be used (if configured) for channel estimation.

Figure 28A:
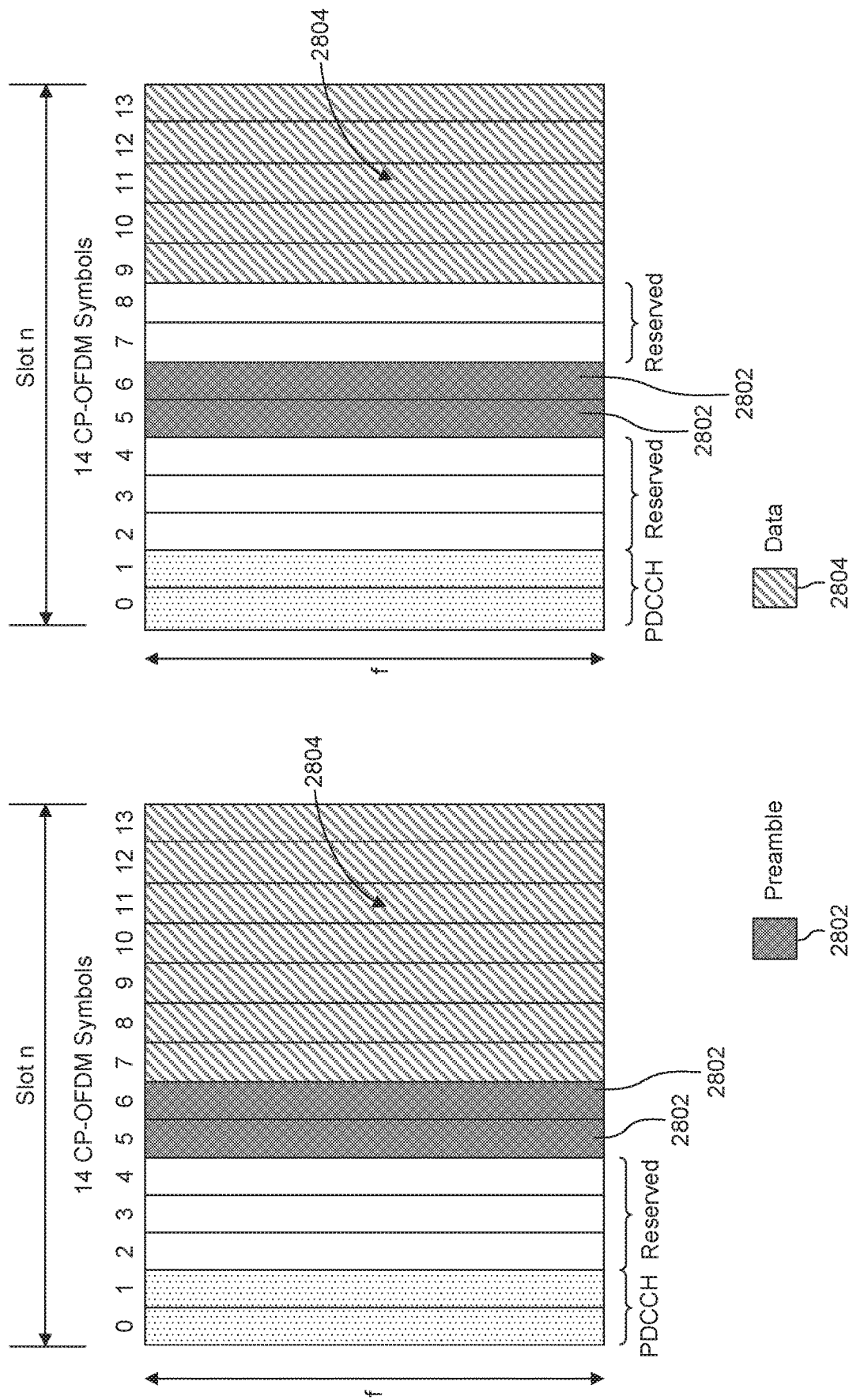
FIG. 28A depicts an example time-frequency resource mapping of a preamble with a data transmission.
Figure 28B:
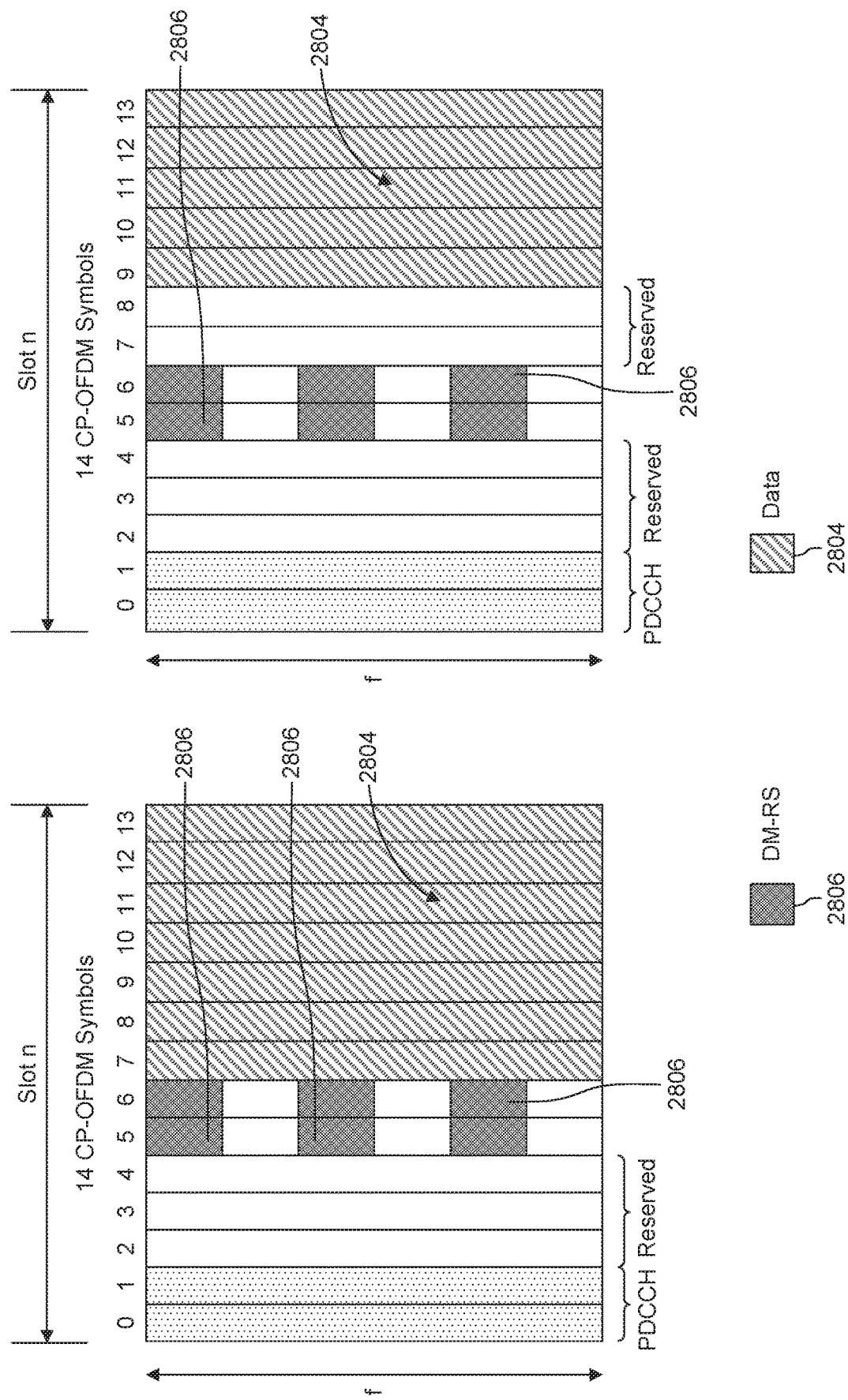
FIG. 28B depicts an example time-frequency resource mapping of a demodulation reference signal (DM-RS) with a data transmission.
Figure 29:
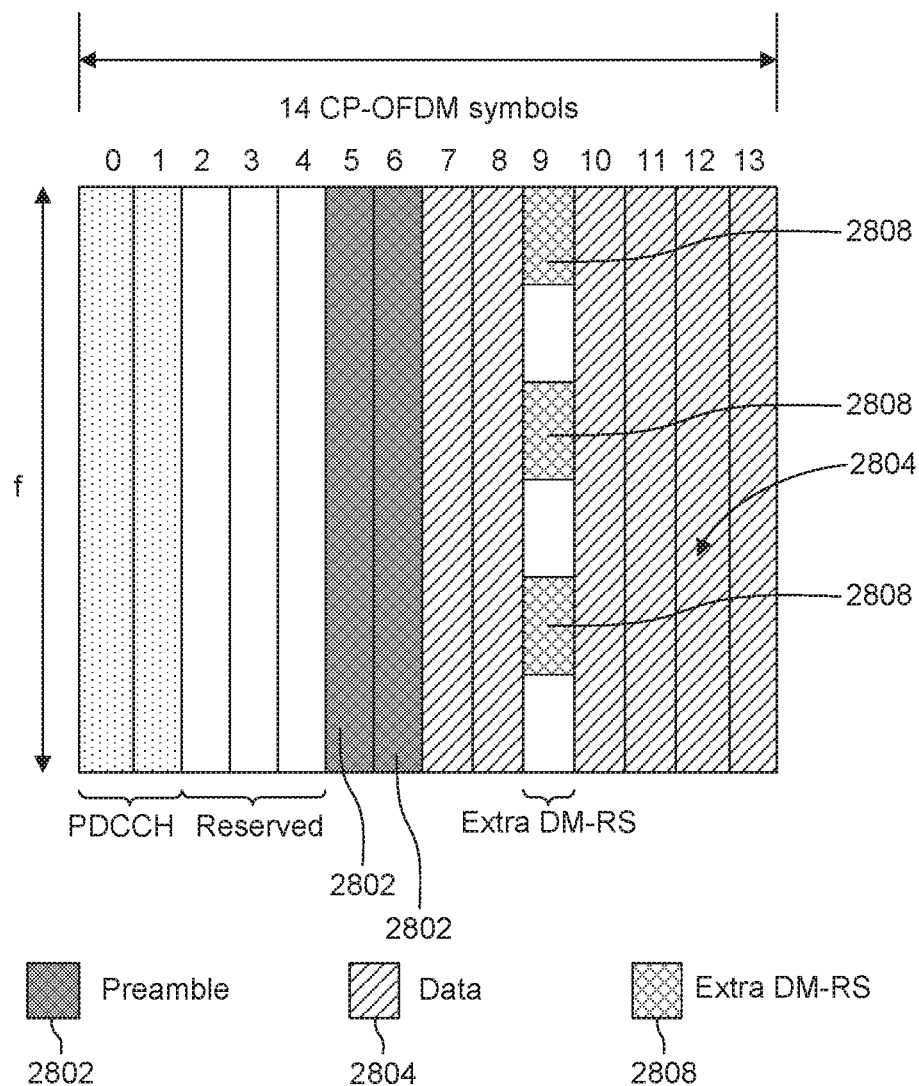
FIG. 29 depicts an example time-frequency resource mapping of a preamble and a demodulation reference signal (DM-RS) with a data transmission.

FIGS. 28A-B and 29 demonstrate example mappings of preambles 2802 or DM-RS 2806 with the transmission of data 2804. A front-loaded preamble 2802 or a DM-RS 2806 can be used for UE activity detection and channel estimation. Once the preamble 2802 or DM-RS 2806 can be identified by the receiver (e.g., gNB), the receiver can convert the detected preamble 2802 or DM-RS 2806 back to the reference bits $m_p$ because the reference bits and information bits are jointly encoded, thereby enhancing decoding performance. In FIG. 29, the example depicts extra DM-RS 2808 that have been allocated for further enhancing channel estimation performance.

Figure 30:
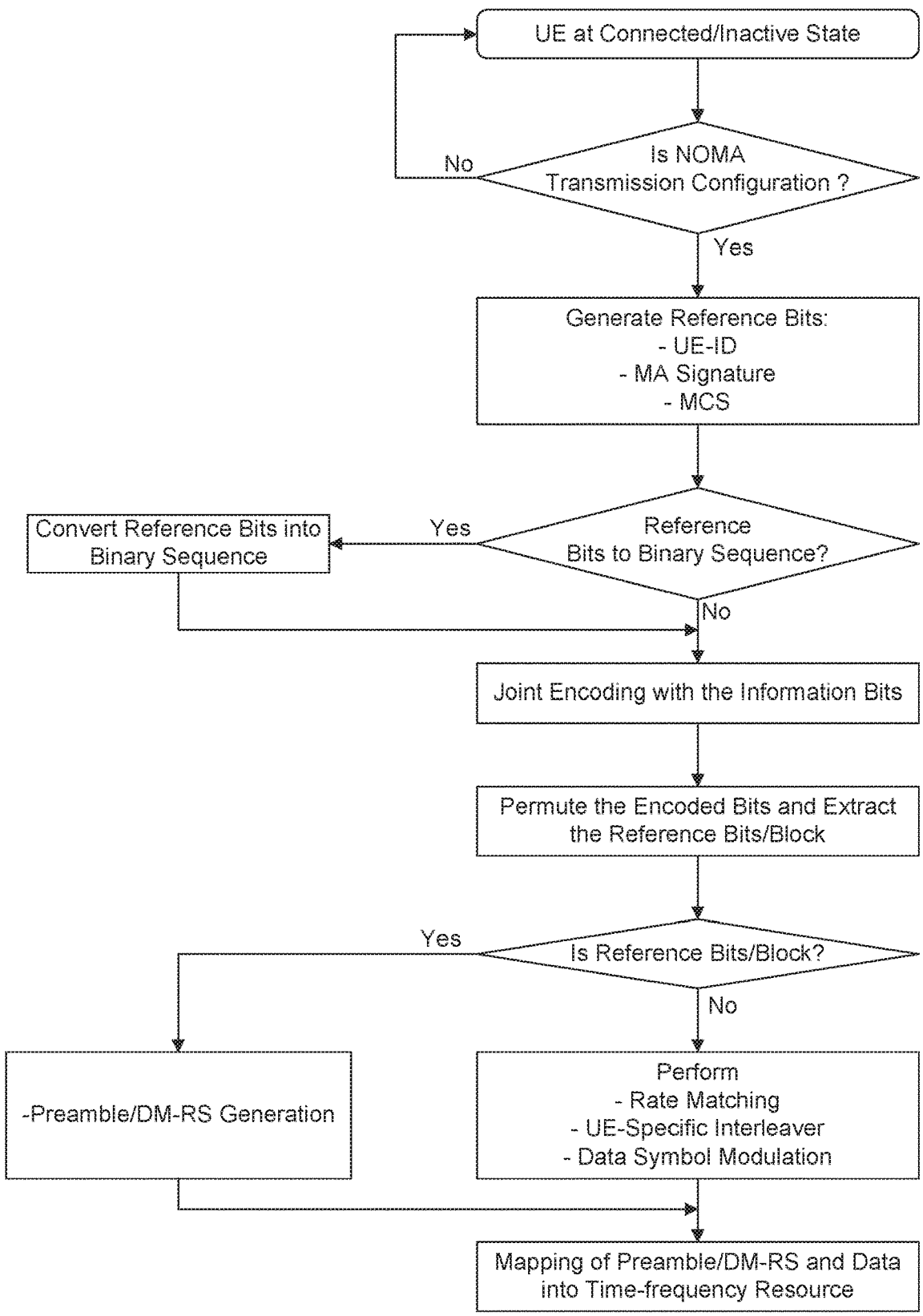
FIG. 30 is a call flow for a UE performing a NOMA transmission in accordance with an example embodiment.

Referring to FIG. 30, a UE method for the above-described NOMA mechanisms is shown. In accordance with the example, at 3002, an example is the connected or inactive state. The UE determines that it is configured for a NOMA transmission at 3004. At 3006, the UE may construct the content of the reference bits based on a pre-configured UE specific ID, which may be signaled by RRC. If MA-ID is included in the content of reference bits, then MA-ID may be used jointly with the UE-specific ID to construct the content of reference bits. If m-sequence or gold sequence is used for the generation of the reference bits/block, then the UE may generate a m-sequence or gold sequence with an initialization vector that is calculated based on the UE-specific ID, MA signature ID, slot, and OFDM symbol index that is configured or scheduled for the data transmission. In the example, reference bits/block are jointly encoded with the information bits/block, at 3008. The UE may perform LDPC encoding with the reference bits/block and the information bits/block. At 3010, the UE may permute the encoded bits and extract the reference bits out for the preamble or DM-RS generation, the information bits/block, and/or parity bits/block. The information bits/block and parity bits/block may be applied with a UE-specific interleaver. The UE may perform the preamble or DM-RS generation based on the reference bits/block. The UE may perform the time-frequency resource mapping for preamble (or DM-RS) with the interleaved data bits (information bits/block and parity bits/blocks) for CP-OFDM or DFT-s-OFDM transmission.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 31A:
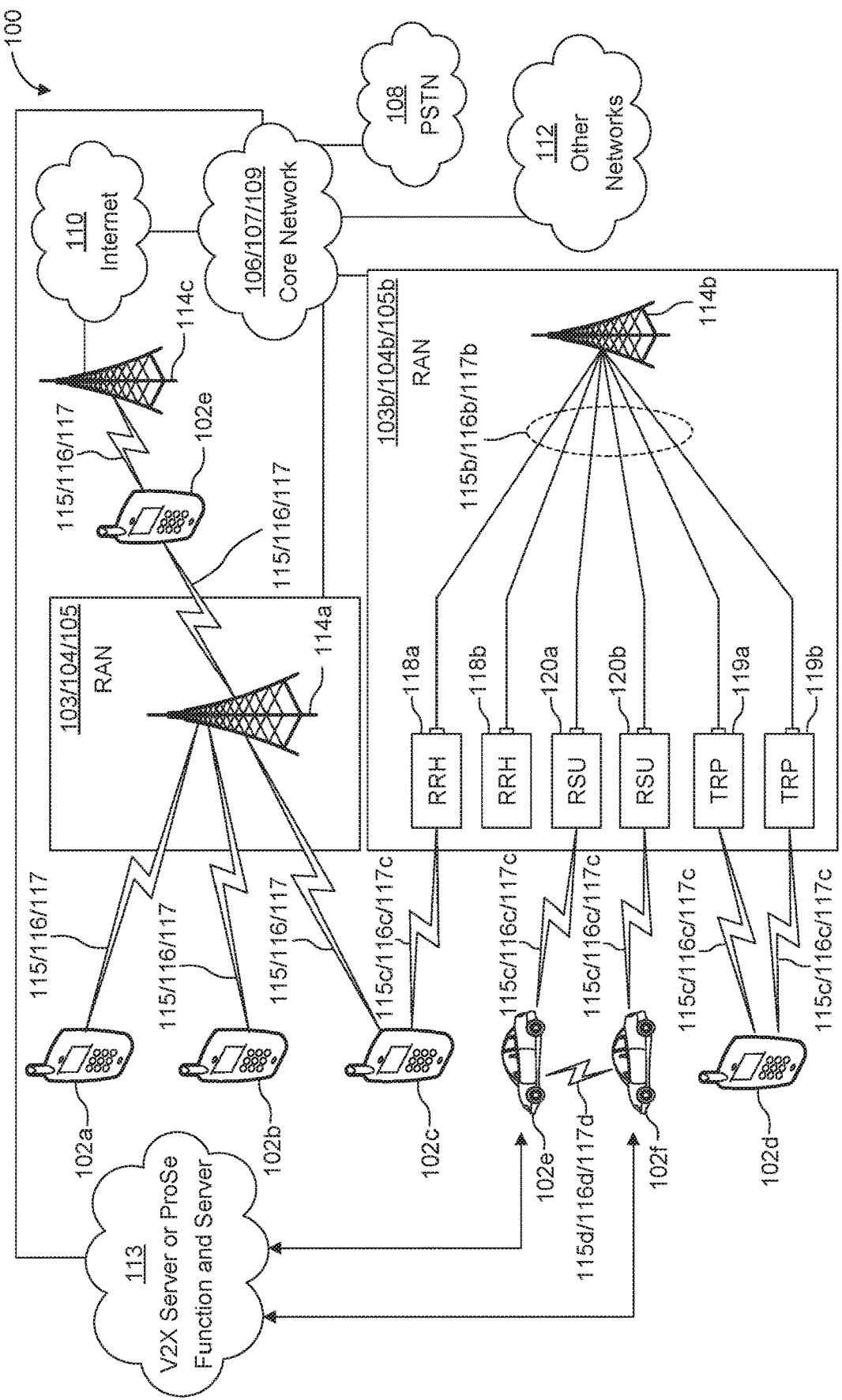
FIG. 31A illustrates one embodiment of an example communications system in which the methods and apparatuses described and claimed herein may be embodied.

FIG. 31A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, and/or 102f (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f may be any type of apparatus or device configured to operate and/or communicate in a wireless environment. Although each WTRU 102a, 102b, 102c, 102d, 102e, 102f is depicted in FIGS. 31A-31E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a, 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a, 120b, may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, and/or 102f may communicate with one another over an air interface 115d/116d/117d, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 31A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 31A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 31A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 31A may be configured to communicate with the base station 114a, which may employ a cellular-based radio technology, and with the base station 114c, which may employ an IEEE 802 radio technology.

Figure 31B:
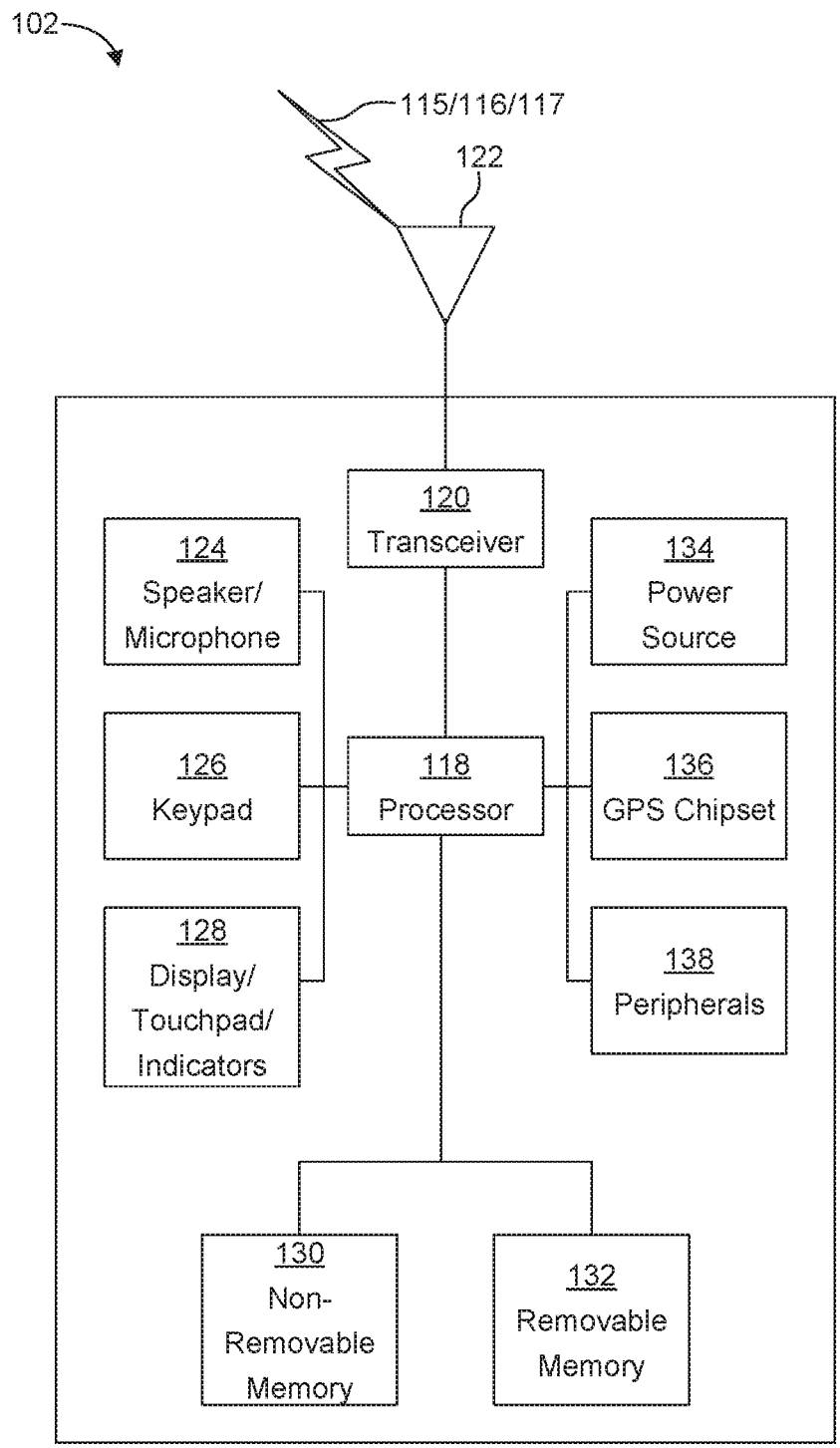
FIG. 31B is a block diagram of an example apparatus or device configured for wireless communications in accordance with the embodiments illustrated herein.

FIG. 31B is a block diagram of an example apparatus or device configured for wireless communications in accordance with the embodiments illustrated herein, such as for example, a WTRU 102. As shown in FIG. 31B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 31B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 31B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 31B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB)

port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 31C:
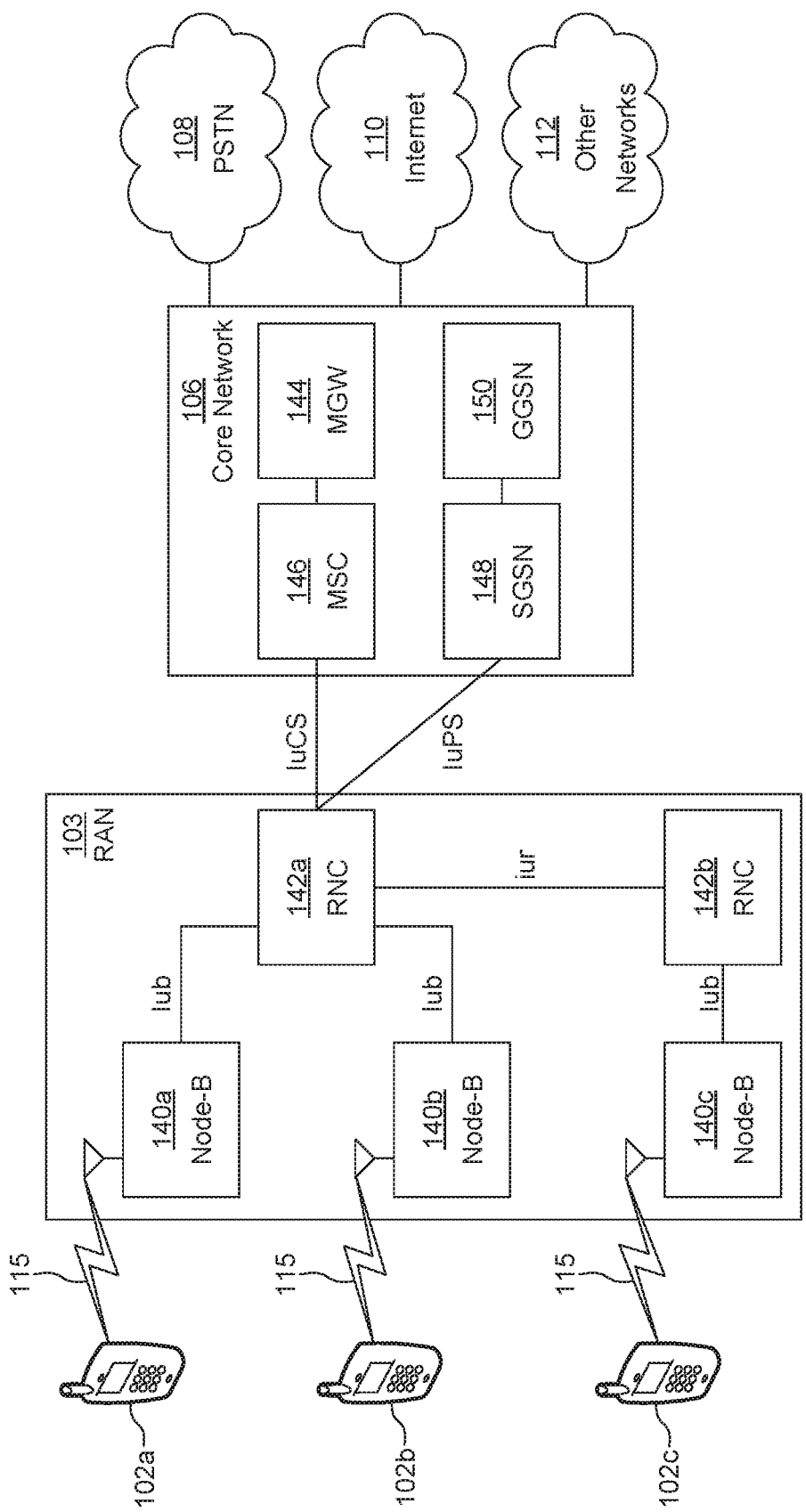
FIG. 31C is a system diagram of an example radio access network (RAN) and core network in accordance with an example embodiment.

FIG. 31C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 31C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 31C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 31C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 31D:
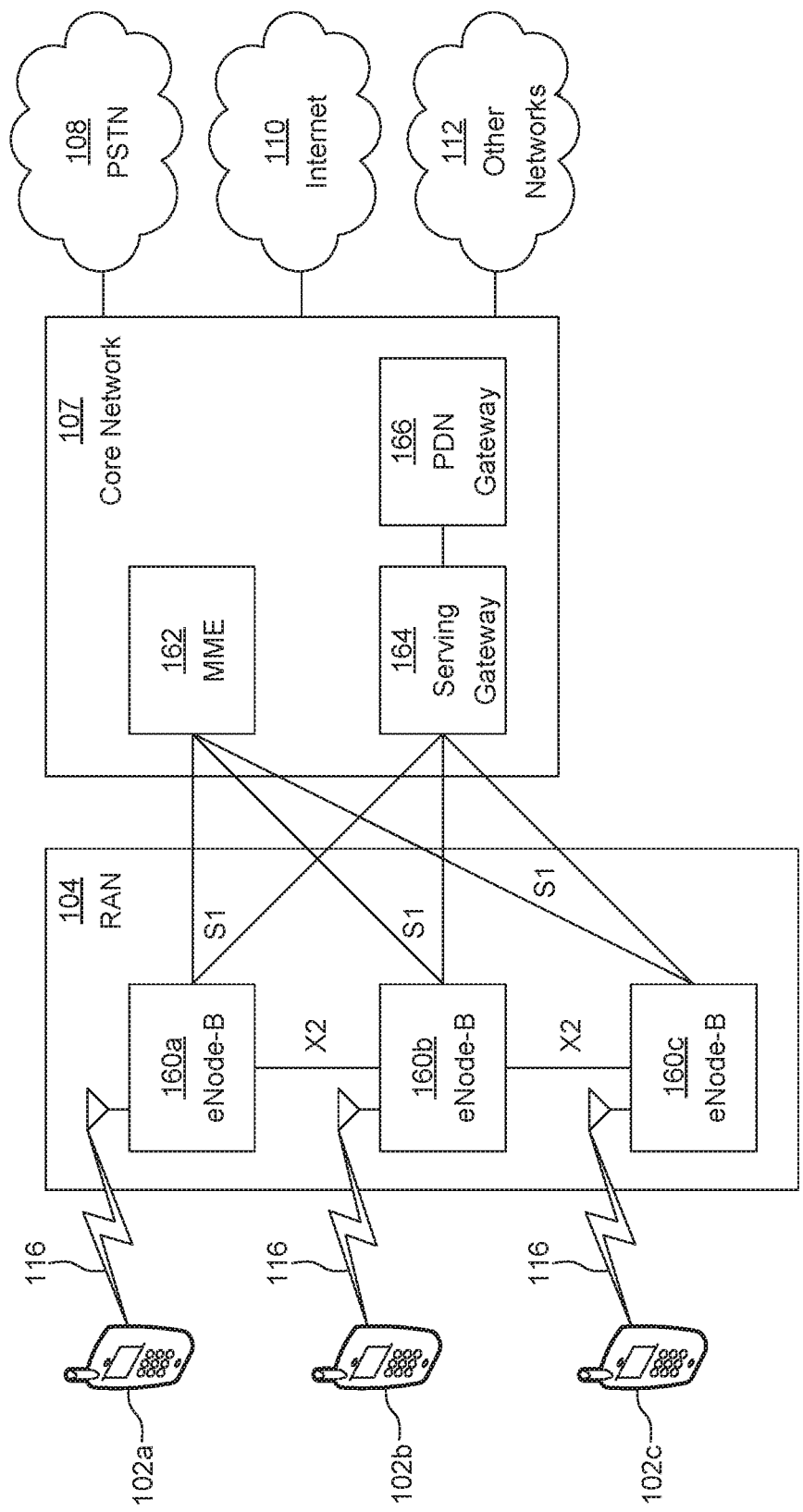
FIG. 31D is another system diagram of a RAN and core network according to another embodiment.

FIG. 31D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 31D, the eNode-Bs 160a, 160b, 160c may communicate with one another over an X2 interface.

The core network 107 shown in FIG. 31D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 31E:
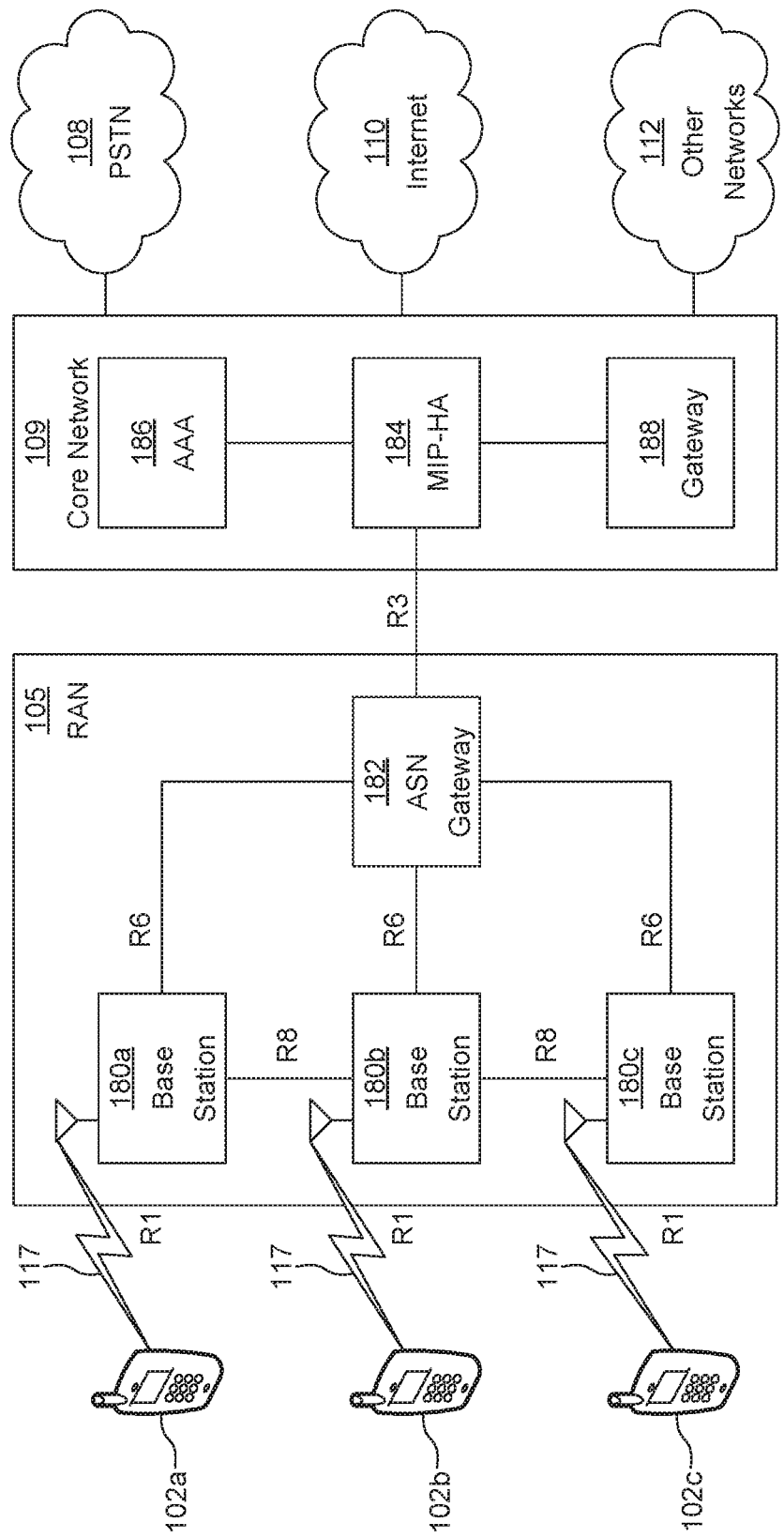
FIG. 31E is another system diagram of a RAN and core network according to another embodiment.

FIG. 31E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 31E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 31E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 31E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 31A, 31C, 31D, and 31E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 31A, 31B, 31C, 31D, and 31E are provided by way of example only, and it is understood that the subject matter disclosed and claimed herein may be embodied or implemented in any similar communication system, whether presently defined or defined in the future.

Figure 31F:
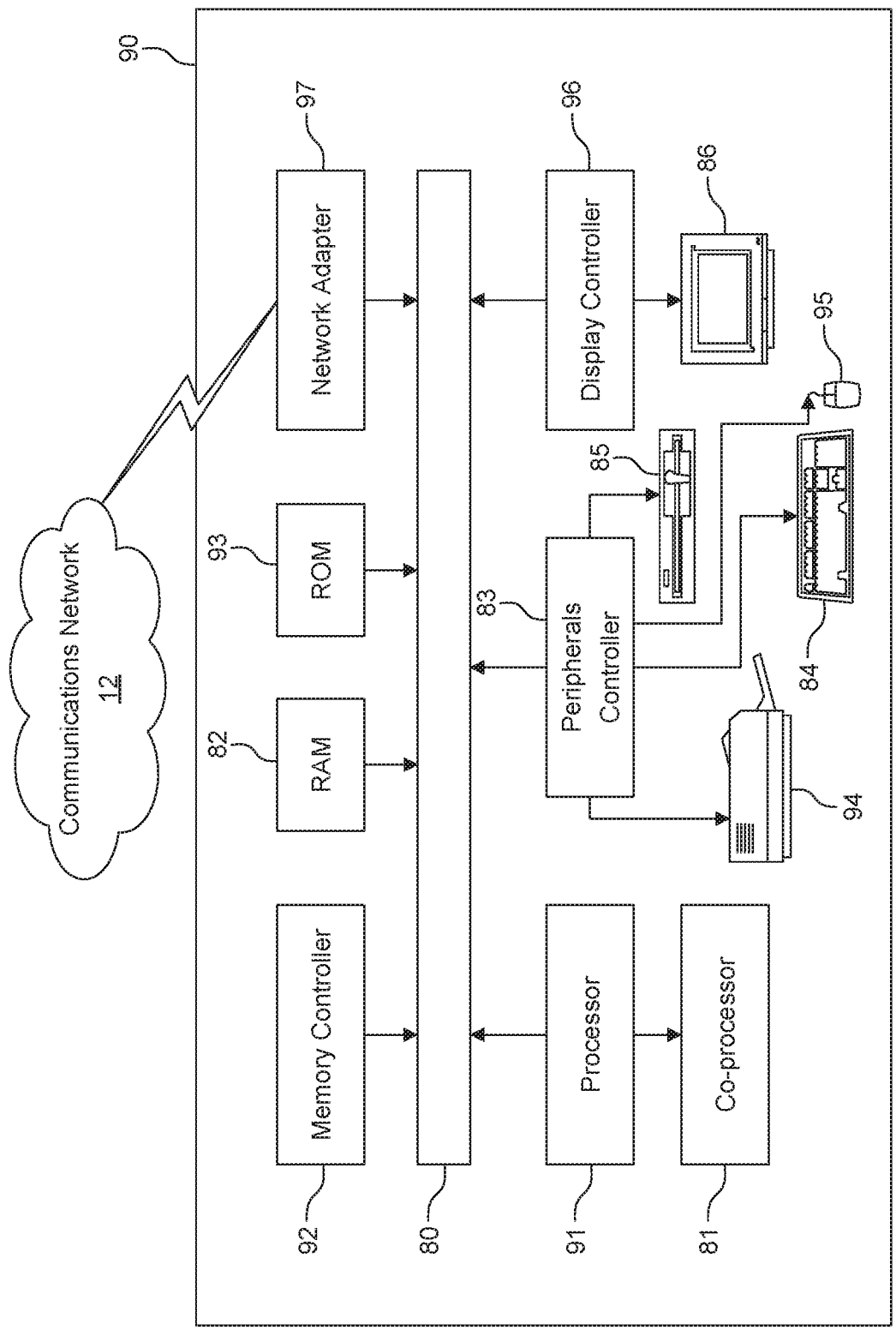
FIG. 31F is a block diagram of an exemplary computing system 90 in which one or more apparatuses of the communications networks illustrated in FIGS. 31A, 31C, 31D and 31E may be embodied.

FIG. 31F is a block diagram of an exemplary computing system 90 in which one or more apparatuses of the communications networks illustrated in FIGS. 31A, 31C, 31D and 31E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 31A, 31B, 31C, 31D, and 31E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 31G:
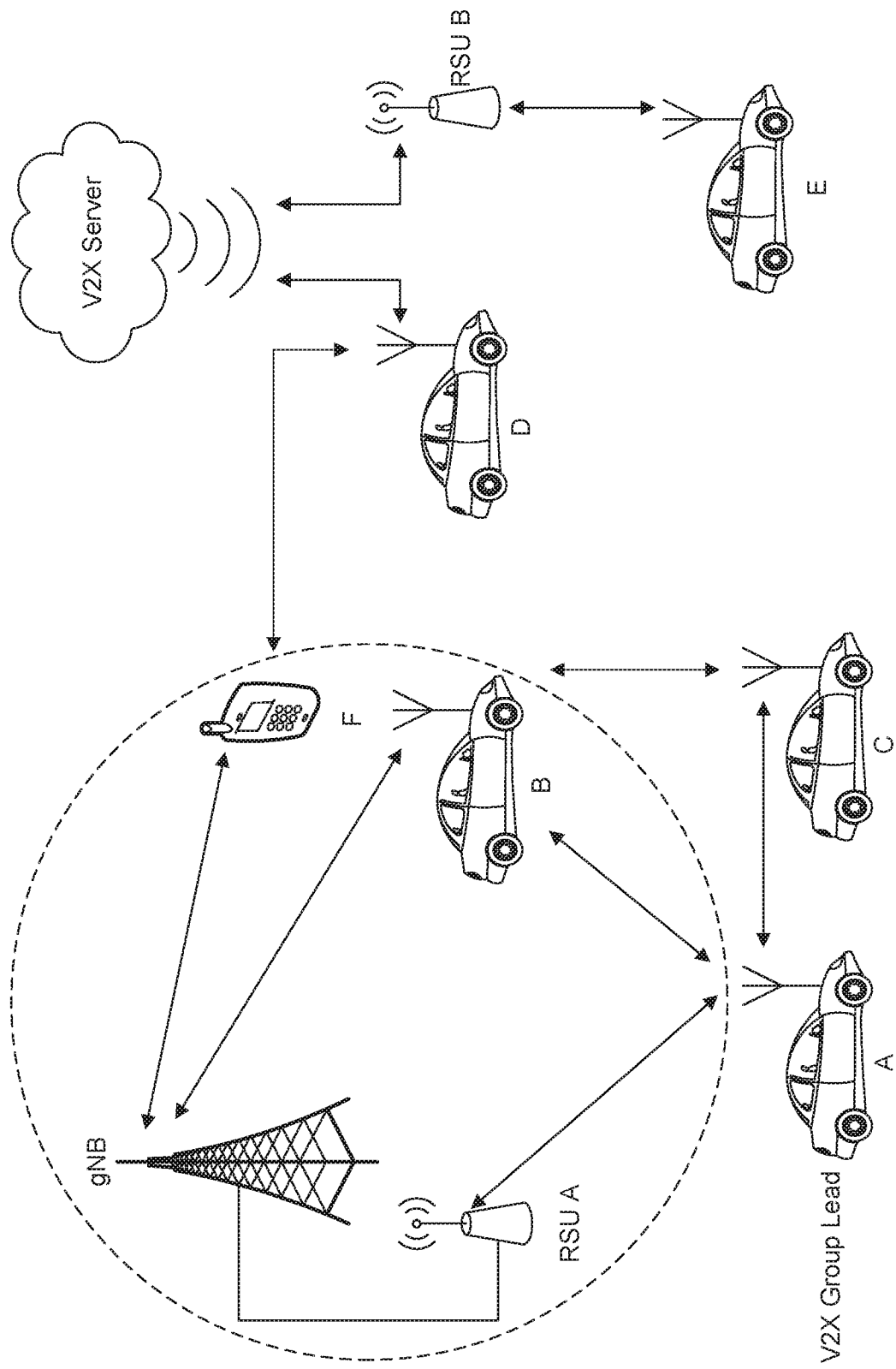
FIG. 31G illustrates one embodiment of another example communications system in which the methods and apparatuses described and claimed herein may be embodied.

FIG. 31G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The following is a list of acronyms relating to NR technologies that may appear in the above description. Unless otherwise specified, the acronyms used herein refer to the corresponding term listed below.

ACK ACKnowledgement
AMF Access and Mobility Management Function
BWP Bandwidth Part
CE Control Element
CORESET Control Resource Set
DCI Downlink Control Information
DL Downlink
DM-RS DeModulation Reference Signal
DRX Discontinuous Reception
eMBB enhanced Mobile Broadband
FDM Frequency-Division Multiplexing
HARQ Hybrid Automatic Repeat Request
HST High Speed Train
IE Information Element
KPI Key Performance Indicators
LTE Long Term Evolution
MAC Medium Access Control
MIB Master Information Block
mMTC massive Machine Type Communication
NOMA Non-Orthogonal Multiple Access
NR New Radio
OFDM Orthogonal Frequency-Division Multiplexing
PDCCH Physical Downlink Control Channel
PDSCH Physical Downlink Shared Data Channel
PTRS Phase Tracking Reference Signal
QAM Quadrature Amplitude Modulation
QCL Quasi Co-Location
RAR Random Access Response RACH Random Access Channel
RE Resource Element
RMSI Remain Minimum System Information
RNTI Radio Network Temporary Identifier
RRC Radio Resource Control
SDT Small Data Transmission
SI System Information
SIB System Information Block
SMF Session Management Function
SP Semi-Persistant
SS Synchronization Signal
TDM Time-Division Multiplexing
TRP Transmission and Reception Point
TRS Time/frequency tracking Reference Signal
UE User Equipment
UL Uplink
URLLC Ultra-Reliable and Low Latency Communications This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus configured to operate as a base station and comprising a processor and a memory, the apparatus further including computer-executable instructions stored in the memory of the apparatus which, when executed by the processor of the apparatus, cause the apparatus to:
configure contention-based radio resources for a physical uplink shared channel (PUSCH) so as to define a configured grant PUSCH (CFG-PUSCH),
wherein the contention-based radio resources comprise a subset of time and frequency resources of a slot, the subset including a first set of contiguous time and frequency resources and a second set of contiguous time and frequency resources, the second set being contiguous with the first set, the first set assigned to the CIG-PUSCH, the second set assigned to a demodulation reference signal (DMRS) of the CFG-PUSCH;
broadcast information to a user equipment (UE) so as to configure the CFG-PUSCH for the UE; and
receive small data transmitted from the UE via the at least one resource of the first set assigned to the CFG-PUSCH,
wherein the small data is transmitted from the UE after the UE transitions from an RRC disconnected state to an RRC connected state while remaining in an RRC-IDLE state or an RRC-INACTIVE state.

2. The apparatus as recited in claim 1, wherein the information comprises one or more non-orthogonal multiple access (NOMA) parameters, such that the CFG-PUSCH is configured with the one or more non-orthogonal multiple access parameters.

3. The apparatus as recited in claim 2, wherein the one or more NOMA parameters comprise an indication associated with at least one of a demodulation reference signal port, a multiple access signature, or an interleaver.

4. The apparatus as recited in claim 1, the apparatus further including computer-executable instructions stored in the memory of the apparatus which, when executed by the processor of the apparatus, cause the apparatus to:
receive the DMRS via the second set,
wherein the second set is at a front of the first set, the front defined with respect to time.

5. The apparatus as recited in claim 1, the apparatus further including computer-executable instructions stored in the memory of the apparatus which, when executed by the processor of the apparatus, cause the apparatus to:
receive, from the UE, a random access preamble that is multiplexed with a small data indicator;
in response to the random access preamble, transmit a random access response to the UE; and
based on the random access response, receive small data transmitted from the UE via a specific payload of the CFG-PUSCH after the UE transitions to an RRC connected state while remaining in an RRC-IDLE state or an RRC-INACTIVE state.

6. The apparatus as recited in claim 5,
wherein the random access preamble that is multiplexed with the small data indicator is received via resources of the CFG-PUSCH;
wherein the small data is received via a specific CFG-PUSCH resource, the specific CFG-PUSCH resource being identified by the random access response.

7. The apparatus as recited in claim 5, wherein the broadcast information comprises:
a time domain allocation indicating a slot offset from a first symbol of the slot and a time domain length;
a frequency domain allocation indicating an initial physical resource block (PRB) location;
a number of allocated PRBs and numerology related to subcarrier spacing;
a transmission periodicity;
a DMRS configuration; and
a NOMA parameter.

8. The apparatus as recited in claim 7,
wherein the subset further includes at least one third set of contiguous time and frequency resources, each of the at least one of the third set being contiguous with the first set and the second set, each of the at least one of the third set assigned as a guard band, and
wherein the broadcast information further includes at least one of:
a cyclic prefix configuration; or
a guard band configuration.

9. The apparatus as recited in claim 1, wherein the information is broadcast in a remaining system information block (RMSI).

10. An apparatus configured to operate as a user equipment and comprising a processor and a memory, the apparatus further including computer-executable instructions stored in the memory of the apparatus which, when executed by the processor of the apparatus, cause the apparatus to:
receive broadcast information from a base station that indicates contention-based radio resources for a physical uplink shared channel (PUSCH) so as to define a (CFG-PUSCH),
wherein the contention-based radio resources comprise a subset of time and frequency resources of a slot, the subset including a first set of contiguous time and frequency resources and a second set of contiguous time and frequency resources, the second set being contiguous with the first set, the first set assigned to the CFG-PUSCH, the second set assigned to a demodulation reference signal (DMRS) of the CFG-PUSCH; and based on the broadcast information, transmit small data to the base station via at least one resource of the first set assigned to the CFG-PUSCH after transitioning from an RRC disconnected state to an RRC, connected state while remaining in an RRC-IDLE state or an RRC-INACTIVE state.

11. The apparatus as recited in claim 10, wherein the broadcast information comprises one or more non-orthogonal multiple access parameters, such that the CFG-PUSCH is configured with the one or more non-orthogonal multiple access (NOMA) parameters.

12. The apparatus as recited in claim 11, wherein the one or more NOMA parameters comprise an indication associated with at least one of a demodulation reference signal port, a multiple access signature, or an interleaver.

13. The apparatus as recited in claim 10, the apparatus further including computer-executable instructions stored in the memory of the apparatus which, when executed by the processor of the apparatus, cause the apparatus to:
  when no timing advance information is available, transmit the small data in an asynchronous mode.

14. The apparatus as recited in claim 10, the apparatus further including computer-executable instructions stored in the memory of the apparatus which, when executed by the processor of the apparatus, cause the apparatus to:
  transmit the DMRS via the second set,
  wherein the second set is at a front of the first set the front defined with respect to time.

15. The apparatus as recited in claim 10, the apparatus further including computer-executable instructions stored in the memory of the apparatus which, when executed by the processor of the apparatus, cause the apparatus to:
  transmit, to the base station, a random access preamble that is multiplexed with a small data indicator;
  in response to the random access preamble, receive a random access response from the base station; and
  based on the random access response, transmit the small data via a specific payload of the CFG-PUSCH.

16. The apparatus as recited in claim 15,
  wherein the random access preamble that is multiplexed with the small data indicator is transmitted via resources of the CFG-PUSCH;
  wherein the small data is transmitted via a specific CFG-PUSCH resource, the specific CFG-PUSCH resource being identified by the random access response.

17. The apparatus as recited in claim 15, wherein the broadcast information comprises:
  a time domain allocation indicating a slot offset from a first symbol of the slot and a time domain length;
  a frequency domain allocation an initial physical resource block (PRB) location;
  a number of allocated PRBs and numerology related to subcarrier spacing;
  a transmission periodicity;
  a DMRS configuration; and
  a NOMA parameter.

18. The apparatus as recited in claim 17,
  wherein the subset further includes at least one third set of contiguous time and frequency resources, each of the at least one of the third set being contiguous with the first set and the second set, each of the at least one of the third set assigned as a guard band;
  wherein the broadcast information further includes at least one of:
    a cyclic prefix configuration; or
    a guard band configuration.

19. The apparatus as recited in claim 10, wherein the information is broadcast in a remaining system information block (RMSI).

* * * * *